(12) United States Patent
Ooigawa et al.

(10) Patent No.: US 8,046,531 B2
(45) Date of Patent: Oct. 25, 2011

(54) STORAGE APPARATUS, MANAGEMENT APPARATUS, AND METHOD OF CONTROLLING STORAGE APPARATUS

(75) Inventors: Akira Ooigawa, Odawara (JP); Kazunari Miyachi, Ebina (JP); Yutaka Kitagawa, Odawara (JP); Chiaki Shoujima, Ooi (JP); Kunihiro Hattori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 419 days.

(21) Appl. No.: 12/311,114

(22) PCT Filed: Mar. 10, 2009

(86) PCT No.: PCT/JP2009/001071
§ 371 (c)(1),
(2), (4) Date: Mar. 19, 2009

(87) PCT Pub. No.: WO2010/103566
PCT Pub. Date: Sep. 16, 2010

(65) Prior Publication Data
US 2010/0281211 A1    Nov. 4, 2010

(51) Int. Cl.
*G06F 12/00* (2006.01)
(52) U.S. Cl. .................. 711/103; 711/E12.001
(58) Field of Classification Search .................. 711/103, 711/104, 100, E12.001, 162
See application file for complete search history.

(56) References Cited

U.S. PATENT DOCUMENTS

| | | | |
|---|---|---|---|
| 7,613,871 B2 * | 11/2009 | Tanaka et al. ................ | 711/103 |
| 2004/0054922 A1 | 3/2004 | Hiraga et al. | |
| 2005/0210211 A1 | 9/2005 | Kodama | |
| 2006/0085413 A1 * | 4/2006 | Ogawa et al. ................ | 707/4 |
| 2006/0085487 A1 | 4/2006 | Hara et al. | |
| 2006/0095688 A1 | 5/2006 | Kawamura et al. | |
| 2007/0250547 A1 * | 10/2007 | Kai et al. ................ | 707/202 |

FOREIGN PATENT DOCUMENTS

| | | |
|---|---|---|
| JP | 2004-86872 | 6/2003 |
| JP | 2006-92276 | 9/2004 |
| JP | 2006-127106 | 10/2004 |
| JP | 2005-267602 | 10/2005 |

OTHER PUBLICATIONS

John Henry Hartman, "The Zebra Striped Network File System," PHD Thesis University of California Berkeley, [Online] 1994, pp. 1-148, XP002551949.
R. J. Green et al., "Designing a fast,on-line backup system for a log-structured file system", Digital Technical Journal Digital Equipment Corp. USA, vol. 8, No. 2, 1996, pp. 32-45.
International Search Report for PCT/JP2009/001071, dated Oct. 30, 2009.

* cited by examiner

*Primary Examiner* — Pierre-Michel Bataille
(74) *Attorney, Agent, or Firm* — Stites & Harbison PLLC; Juan Carlos A. Marquez, Esq.

(57) ABSTRACT

In a storage apparatus comprising a communication interface that receives an I/O request sent from a host apparatus, a storage device controller that performs writing and reading of data with respect to a storage device, and a cache memory that stores data to be written in the storage device or data read from the storage device, a journal volume operated as a volume for which update writing is prohibited and write once is permitted is provided, on the basis of a storage area provided by the storage device, and a virtual volume is provided as a volume accessible from the host apparatus, the journal volume being the entity of the virtual volume, the virtual volume being a volume for which an attribute (Read/Add) that permits only reading and write once is settable.

14 Claims, 26 Drawing Sheets

VIRTUAL VOLUME MANAGEMENT TABLE 421

| 4211 | 4212 | 4213 | 4214 | 4215 | 4216 |
|---|---|---|---|---|---|
| V-VOL# | FORMATTING TYPE | CAPACITY(GByte) | ATTRIBUTE | EXPIRATION PERIOD | END LBA# |
| 1001 | OPEN | 2.09 | Read/Add | 1800 DAYS | xxxx000c |
| 1002 | OPEN | 2.09 | Read/Only | 865 DAYS | xxxx003f |
| 1003 | OPEN | 2.09 | Read/Add | 865 DAYS | xxxx8c5f |
| 1004 | OPEN | 2.09 | Read/Add | 0 DAYS | xxxx086f |
| 1005 | OPEN | 2.09 | Protect | 1352 DAYS | xxxx10a7 |
| 1006 | OPEN | 2.09 | Read/Only | 690 DAYS | xxxx148f |

[Fig. 1]
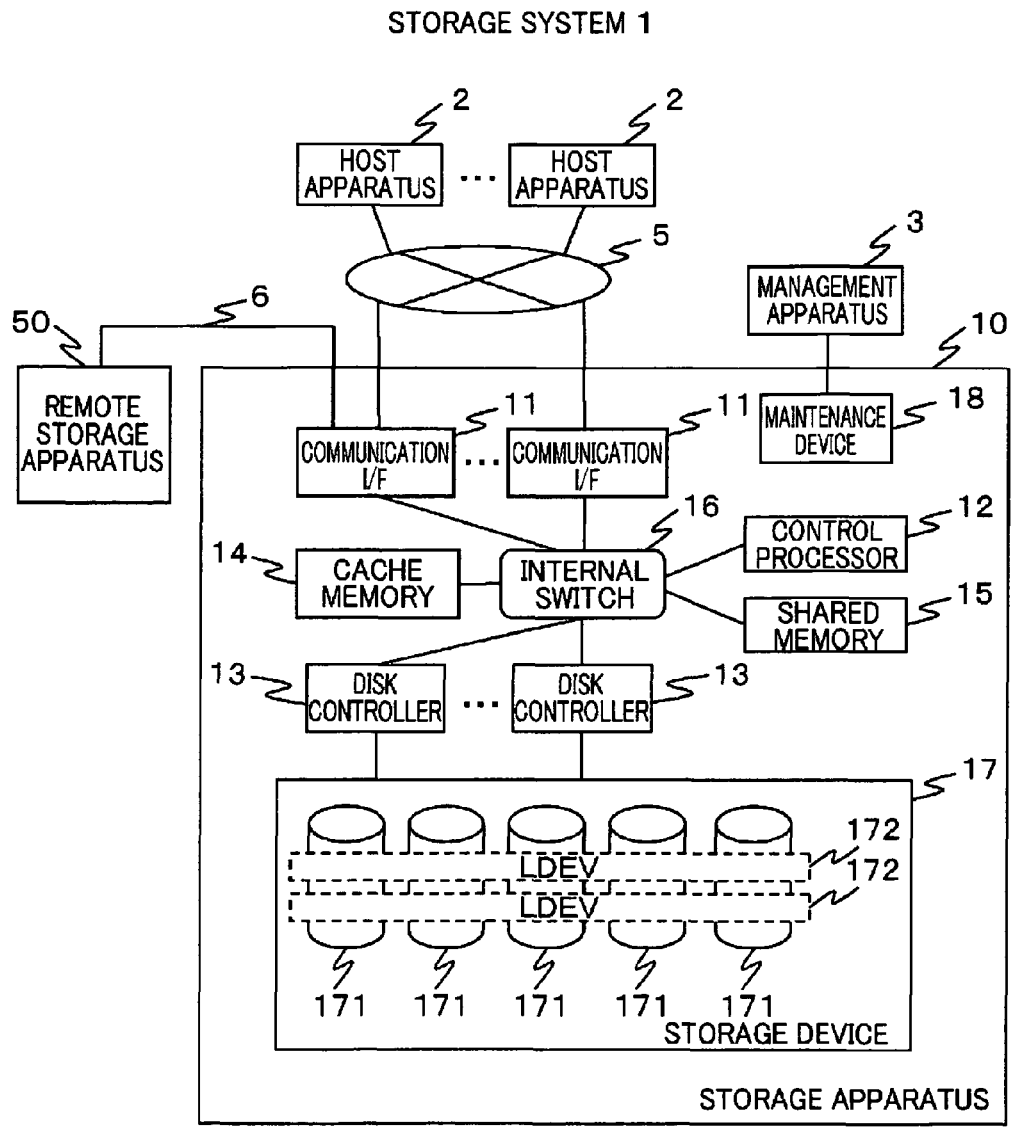

[Fig. 2A]
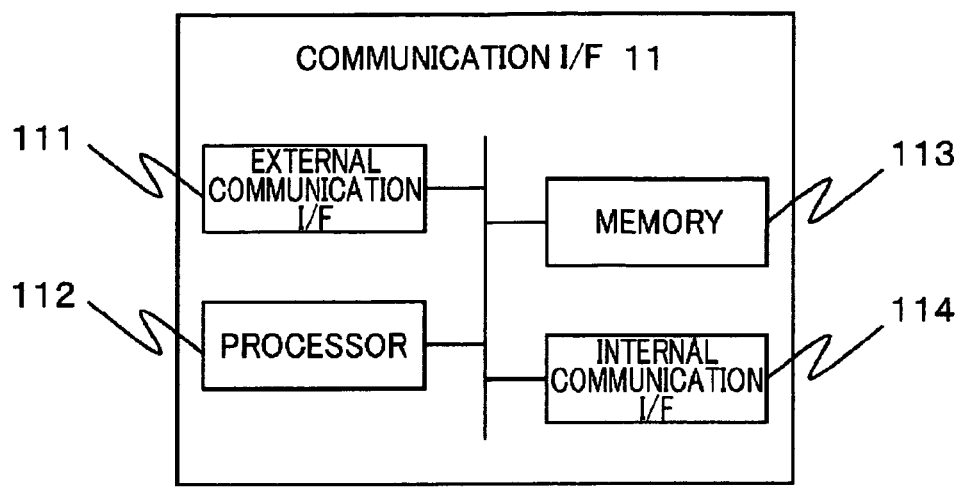
[Fig. 2B]
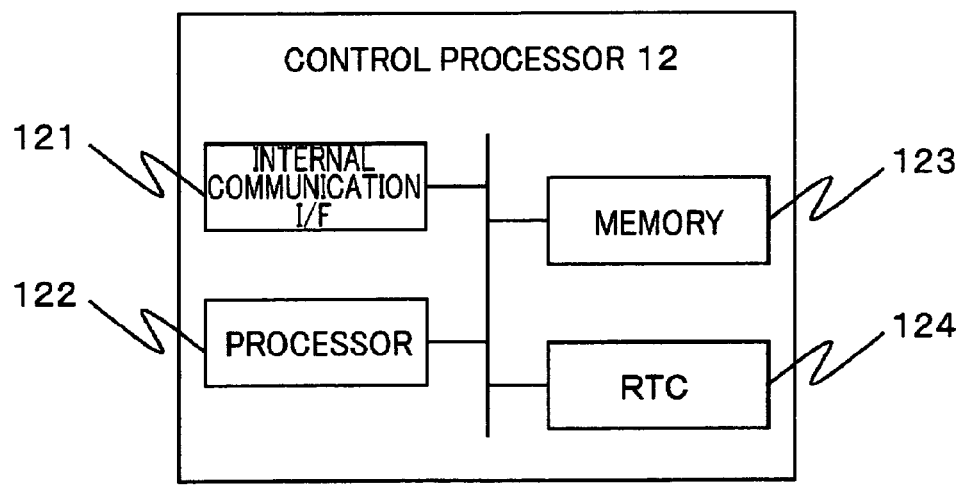

[Fig. 2C]
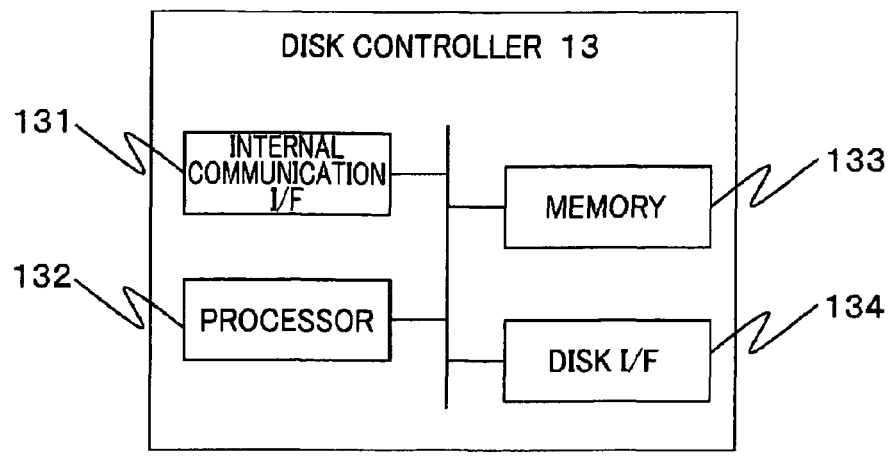
[Fig. 3]
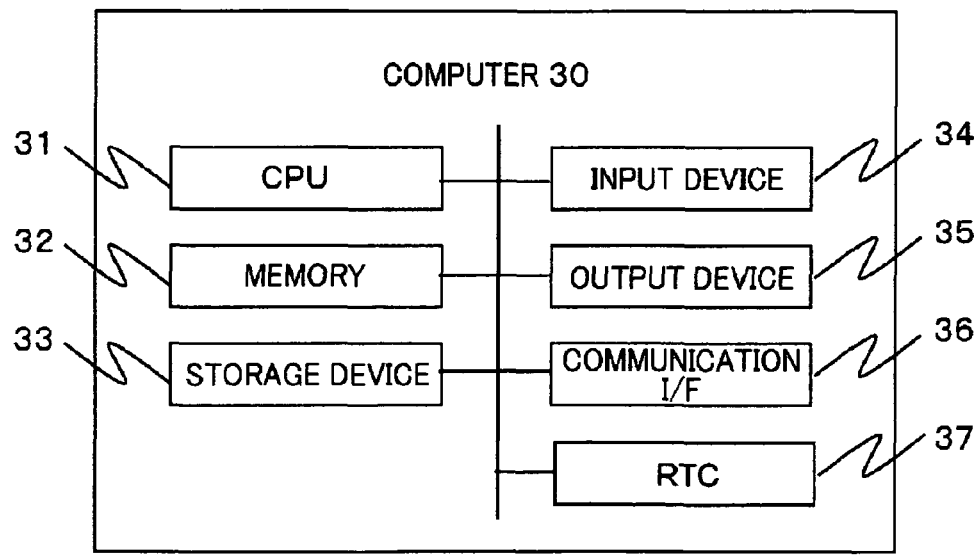

[Fig. 4A]
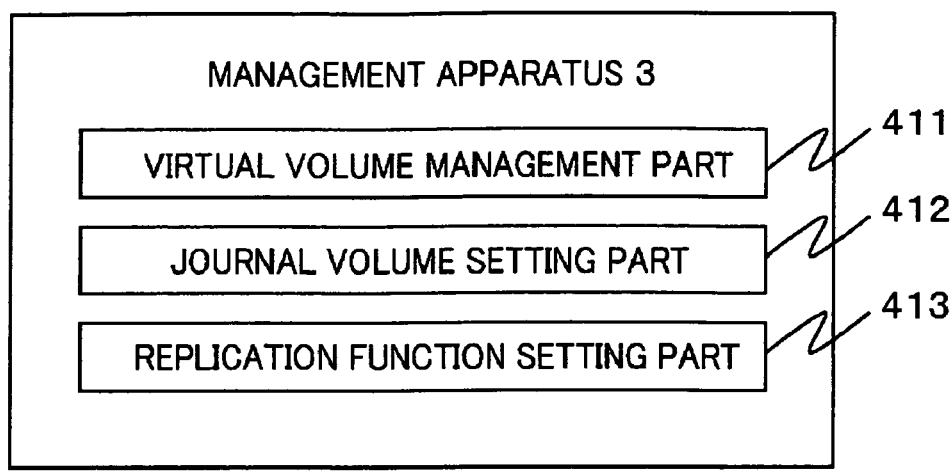

[Fig. 4B]
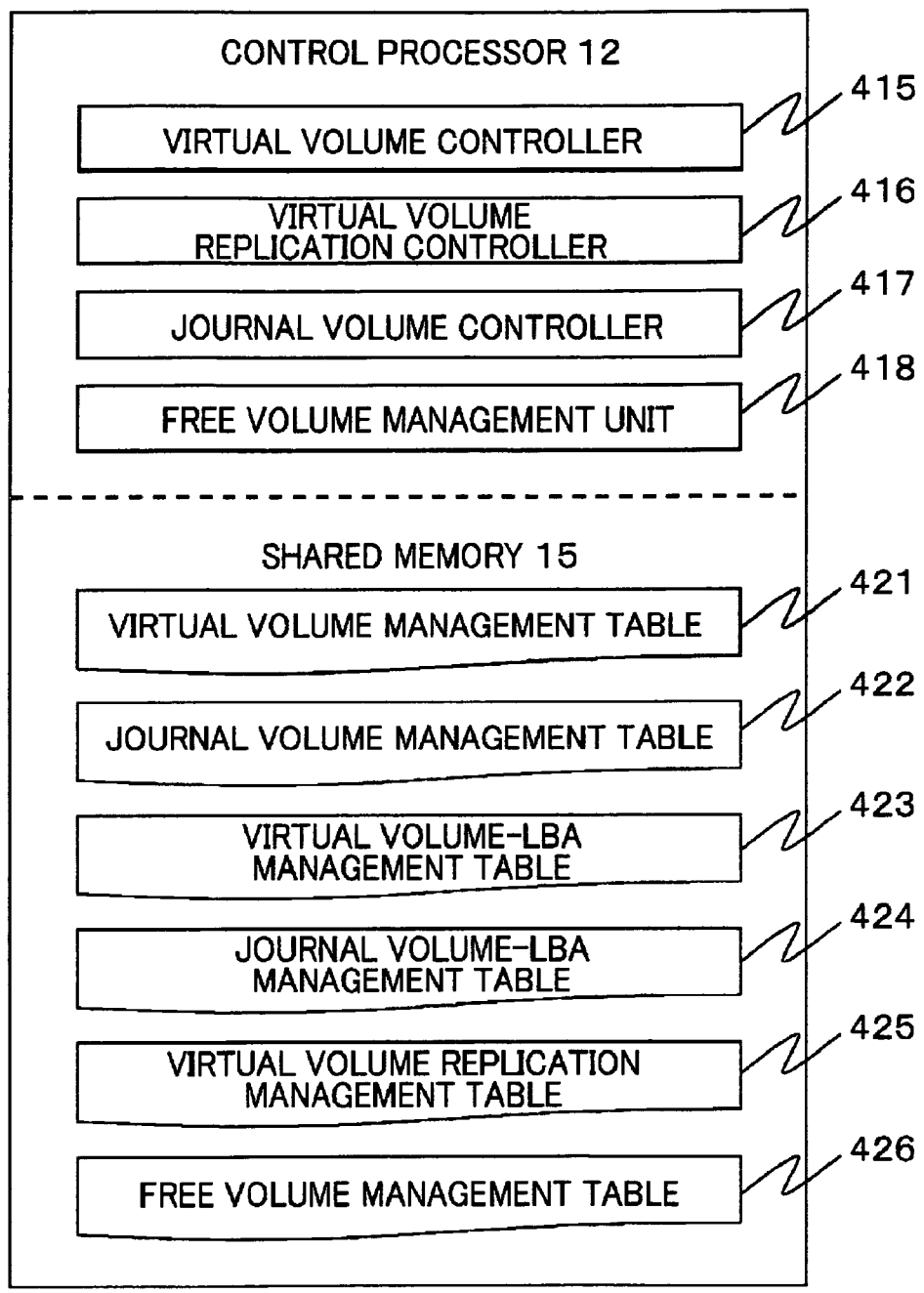

[Fig. 5]
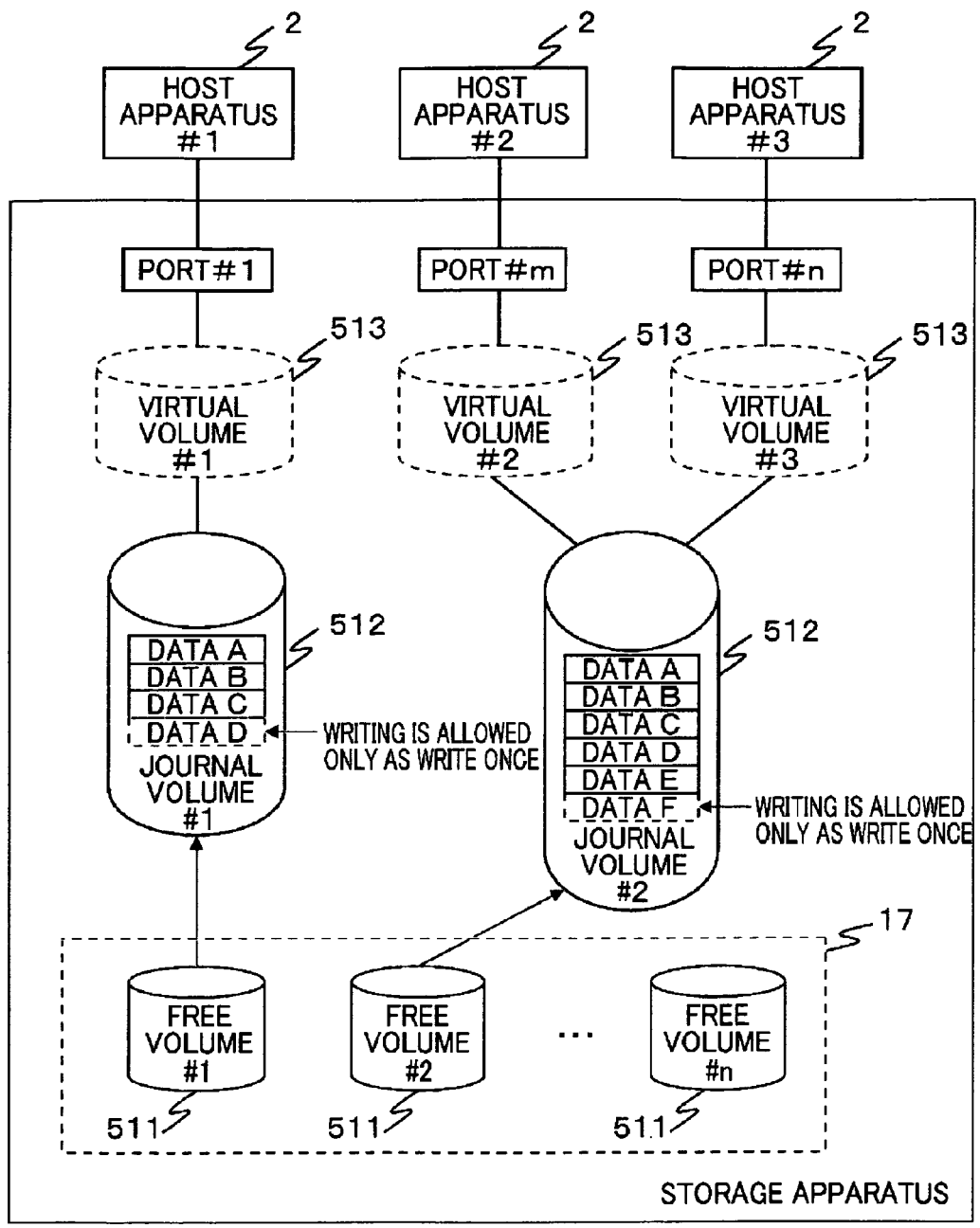

[Fig. 6A]

VIRTUAL VOLUME MANAGEMENT TABLE 421

| V-VOL# 4211 | FORMATTING TYPE 4212 | CAPACITY(GByte) 4213 | ATTRIBUTE 4214 | EXPIRATION PERIOD 4215 | END LBA# 4216 |
|---|---|---|---|---|---|
| 1001 | OPEN | 2.09 | Read/Add | 1800 DAYS | xxxx000c |
| 1002 | OPEN | 2.09 | Read/Only | 865 DAYS | xxxx003f |
| 1003 | OPEN | 2.09 | Read/Add | 865 DAYS | xxxx8c5f |
| 1004 | OPEN | 2.09 | Read/Add | 0 DAYS | xxxx086f |
| 1005 | OPEN | 2.09 | Protect | 1352 DAYS | xxxx10a7 |
| 1006 | OPEN | 2.09 | Read/Only | 690 DAYS | xxxx148f |

[Fig. 6B]

JOURNAL VOLUME MANAGEMENT TABLE 422

| J-VOL# (4221) | FORMATTING TYPE (4222) | CAPACITY(GByte) (4223) | END LBA# (4224) |
|---|---|---|---|
| 01 | OPEN | 50.00 | xxxx550c |
| 02 | OPEN | 100.00 | xxxx083f |
| 03 | OPEN | 70.00 | xxxx835e |

[Fig. 6C]

VIRTUAL VOLUME-LBA MANAGEMENT TABLE 423

| VIRTUAL VOLUME | | JOURNAL VOLUME | | REPLICATION COMPLETION FLAG |
|---|---|---|---|---|
| V-VOL# (4231) | LBA# (4232) | J-VOL# (4233) | LBA# (4234) | (4235) |
| 1001 | xxxxxxx0 | 01 | xxxxxxx0 | 1 |
| 1001 | xxxxxxx1 | 01 | xxxxxxx1 | 1 |
| 1001 | xxxxxxx2 | 01 | null | 0 |
| . | . | . | . | |
| . | . | . | . | |
| . | . | . | . | |
| 1001 | nnnnnnnn | 01 | null | |
| 1002 | xxxxxxx0 | 02 | xxxxxxx0 | 1 |
| 1002 | xxxxxxx1 | 02 | xxxxxxx2 | |
| . | . | . | . | |
| . | . | . | . | |
| . | . | . | . | |
| 1003 | xxxxxxx0 | 02 | | |
| . | . | . | | |
| . | . | . | | |
| . | . | . | | |
| 1003 | nnnnnnnn | 02 | null | |

[Fig. 6D]

JOURNAL VOLUME-LBA MANAGEMENT TABLE 424

4241  4242  4243

| J-VOL# | LBA# | TIME |
|--------|------|------|
| 01 | xxxxxxx0 | 00:00 |
| 01 | xxxxxxx1 | 01:00 |
| 01 | xxxxxxx2 | 01:10 |
| ⋮ | ⋮ | ⋮ |
| 01 | nnnnnnnn | null |
| 02 | xxxxxxx0 | 00:10 |
| 02 | xxxxxxx1 | 02:00 |
| ⋮ | ⋮ | ⋮ |
| 02 | nnnnnnnn | null |

[Fig. 6E]
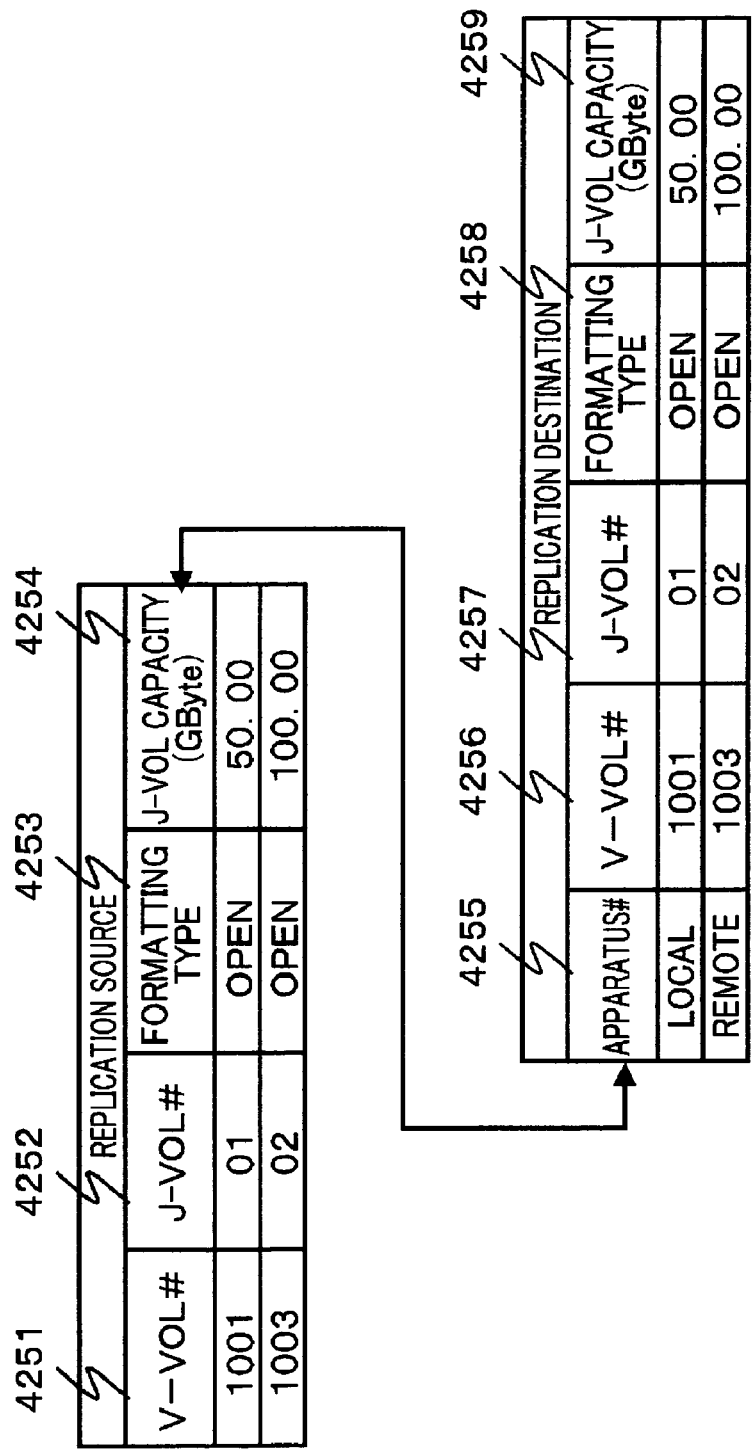

[Fig. 7]
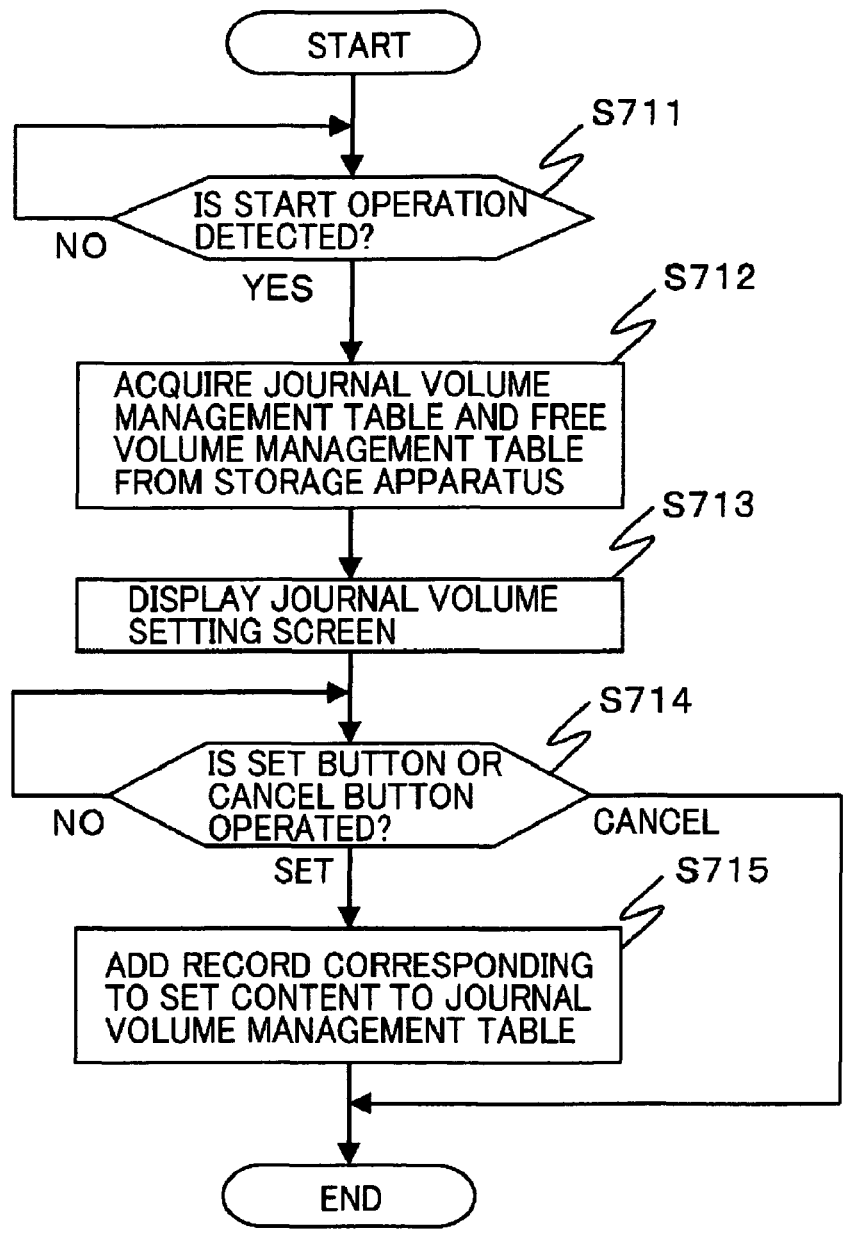

[Fig. 8]

JOURNAL VOLUME SETTING SCREEN 800

EDIT AND CREATE JOURNAL VOLUME

| JOURNAL VOLUME | | |
|---|---|---|
| J-VOL | FORMATTING TYPE | CAPACITY |
| 01 | OPEN | 50.00GB |
| 02 | OPEN | 100.00GB |
| 03 | OPEN | 70.00GB |

813 — ↑ ADD     DELETE↓ — 814

| FREE VOLUME | | |
|---|---|---|
| Parity Group | FORMATTING TYPE | CAPACITY |
| 1-1 | OPEN | 20.00GB |
| 1-1 | OPEN | 30.00GB |
| 1-2 | OPEN | 5.00GB |
| 2-1 | OPEN | 100.00GB |
| 2-2 | OPEN | 50.00GB |
| 2-3 | OPEN | 25.00GB |

SET   CANCEL
815    816

[Fig. 9]
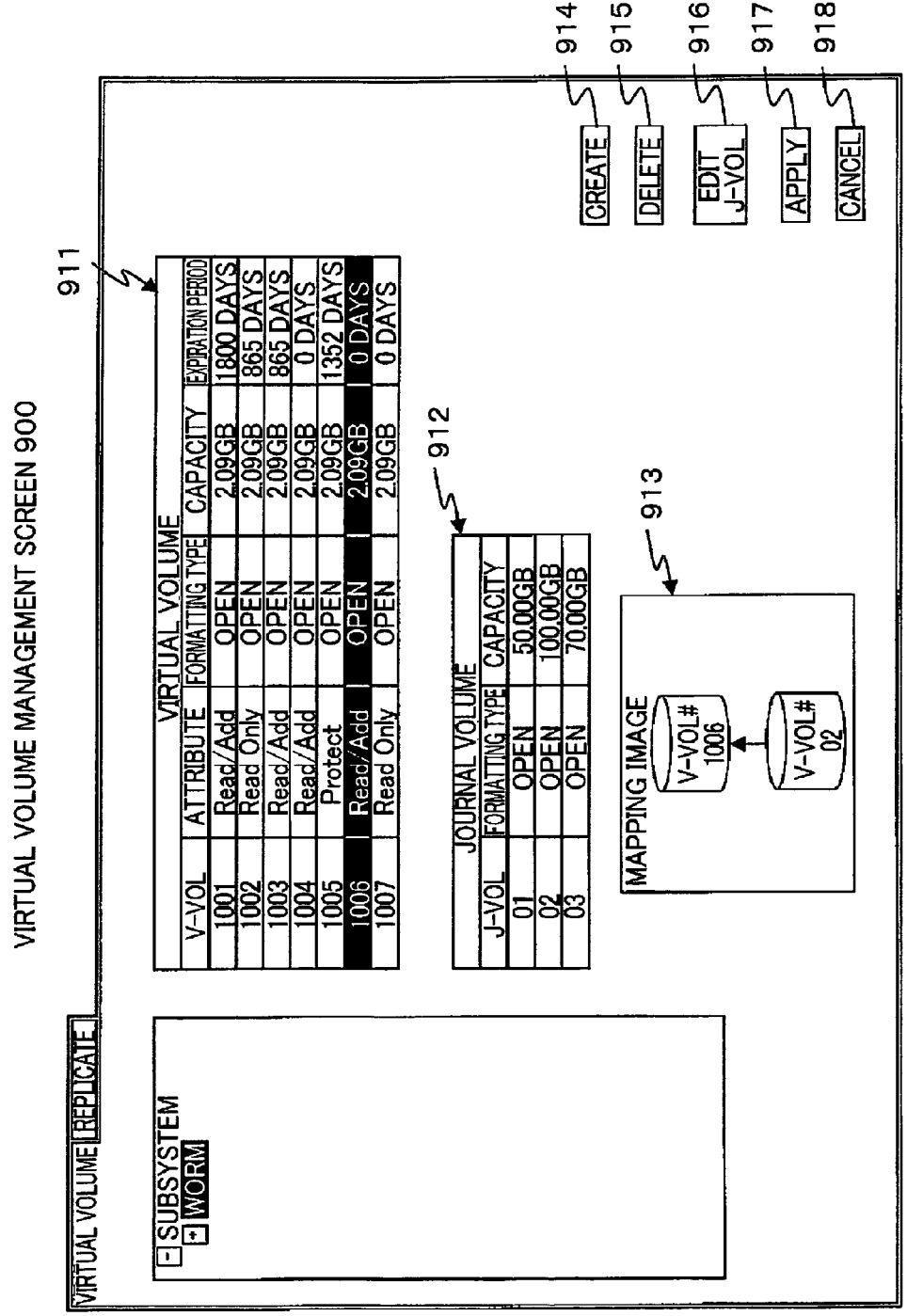

[Fig. 10]
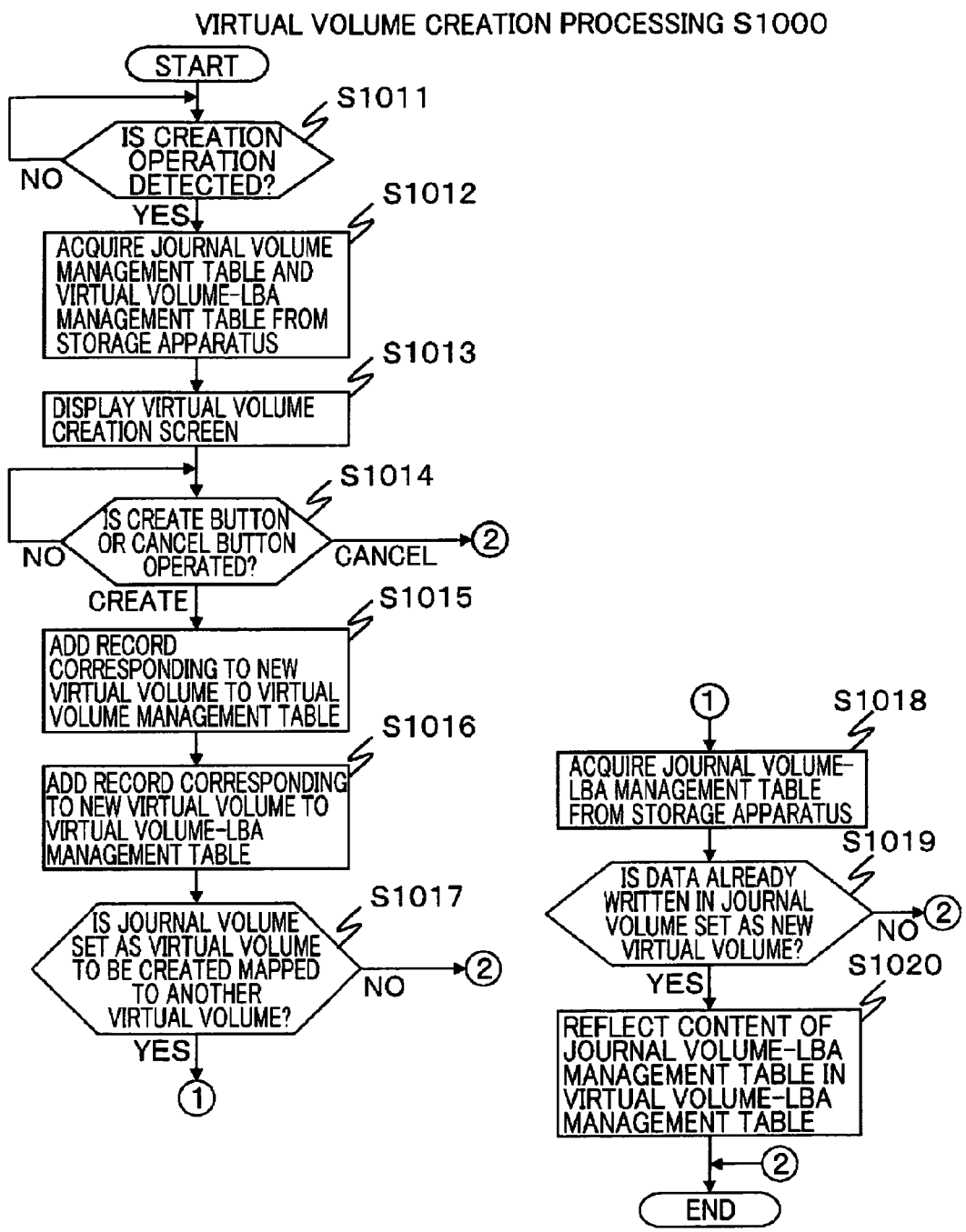

[Fig. 11]

VIRTUAL VOLUME CREATION SCREEN 1100

CREATE VIRTUAL VOLUME

| V-VOL# | 1010 | 1111 |
|---|---|---|
| FORMATTING TYPE | OPEN | 1112 |
| CAPACITY | 2.09GB | 1113 |
| ATTRIBUTE | Read/Add | 1114 |
| EXPIRATION PERIOD | 500 DAYS | |

1115

| J-VOL# | 03 |
|---|---|

1116

CREATE 1121

CANCEL 1122

[Fig. 12]
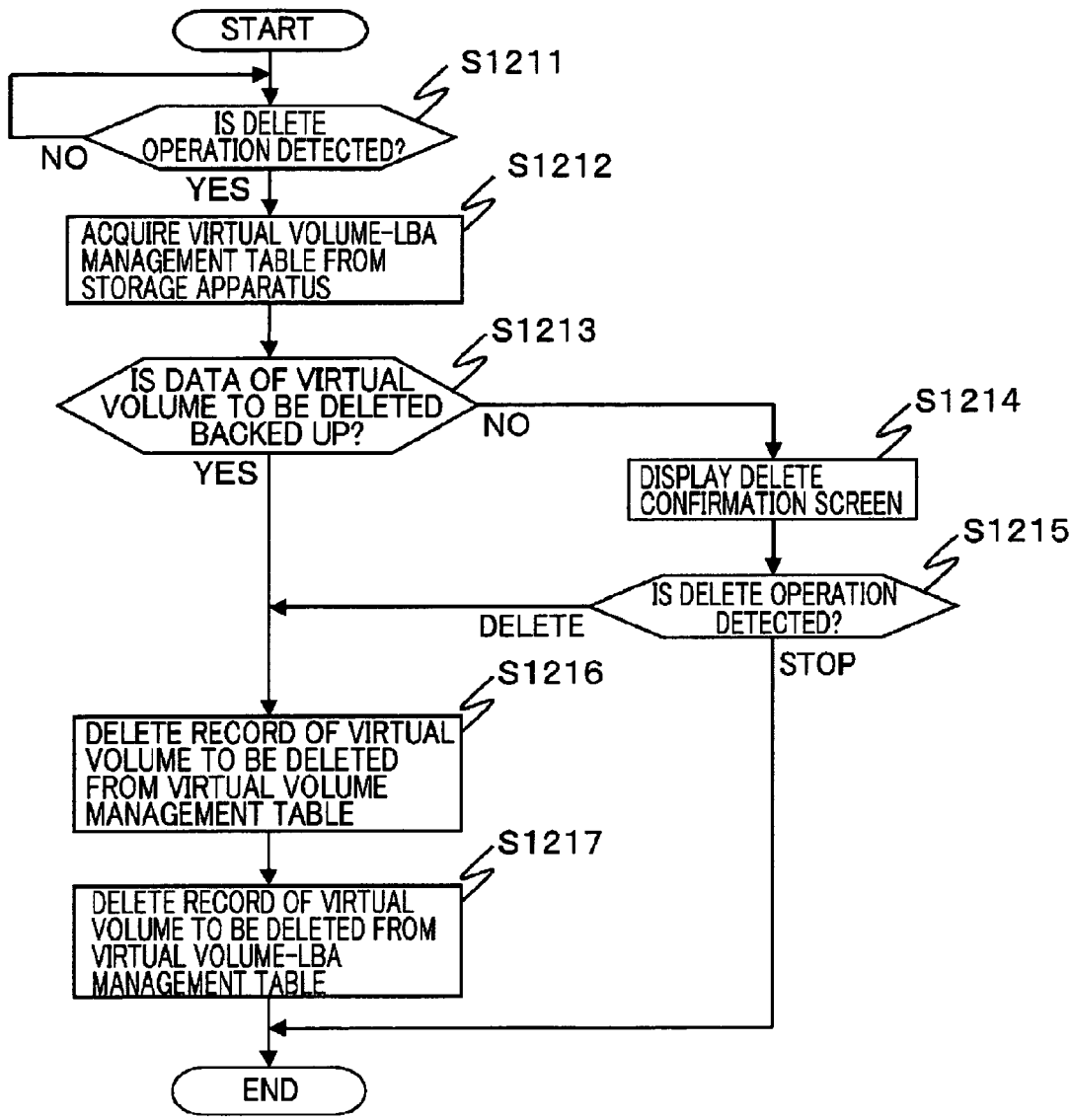

[Fig. 13]
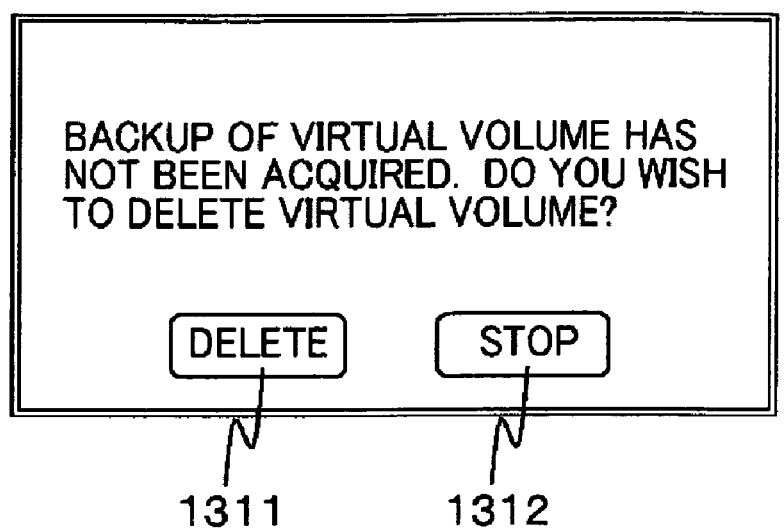

[Fig. 14]
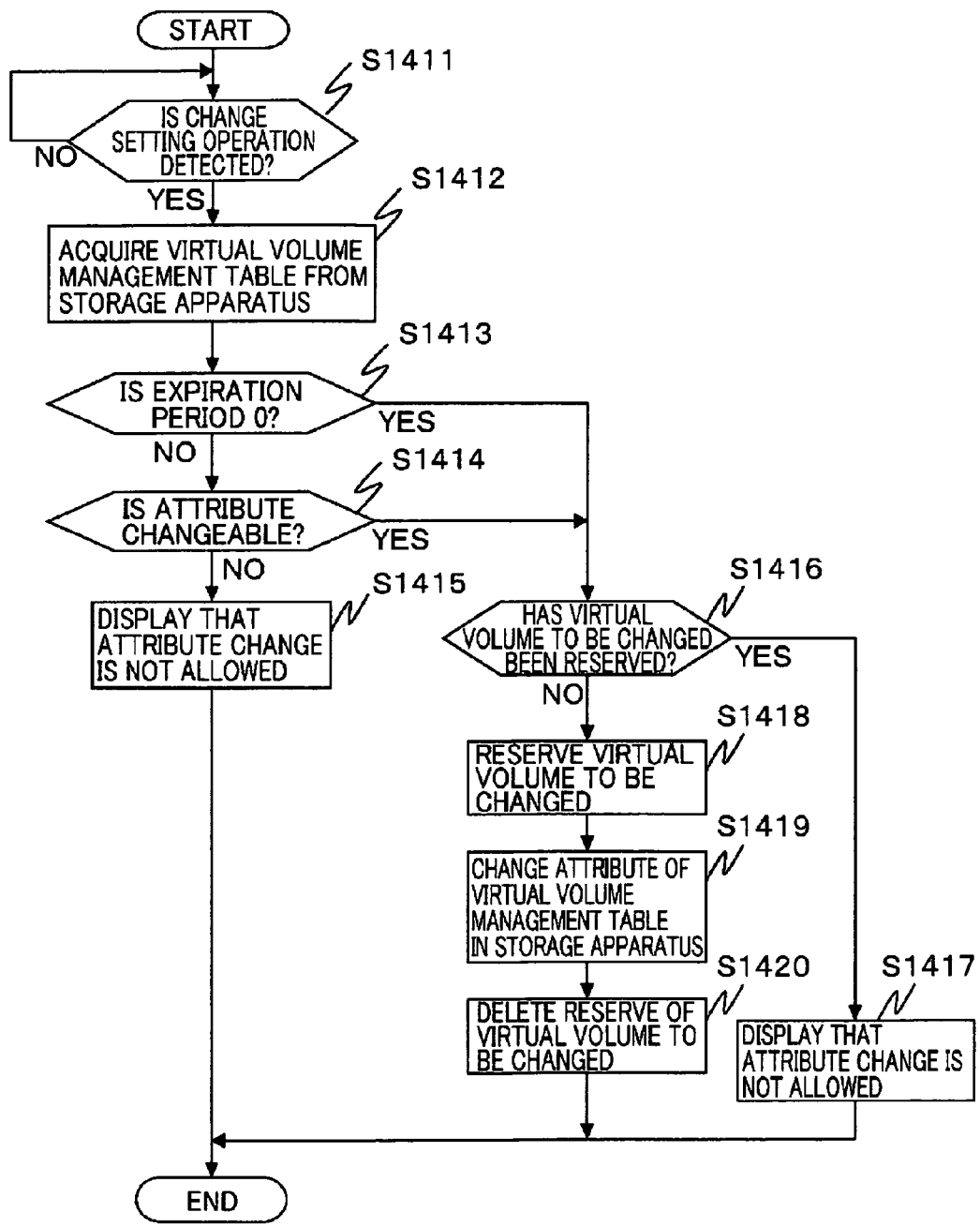

[Fig. 15]
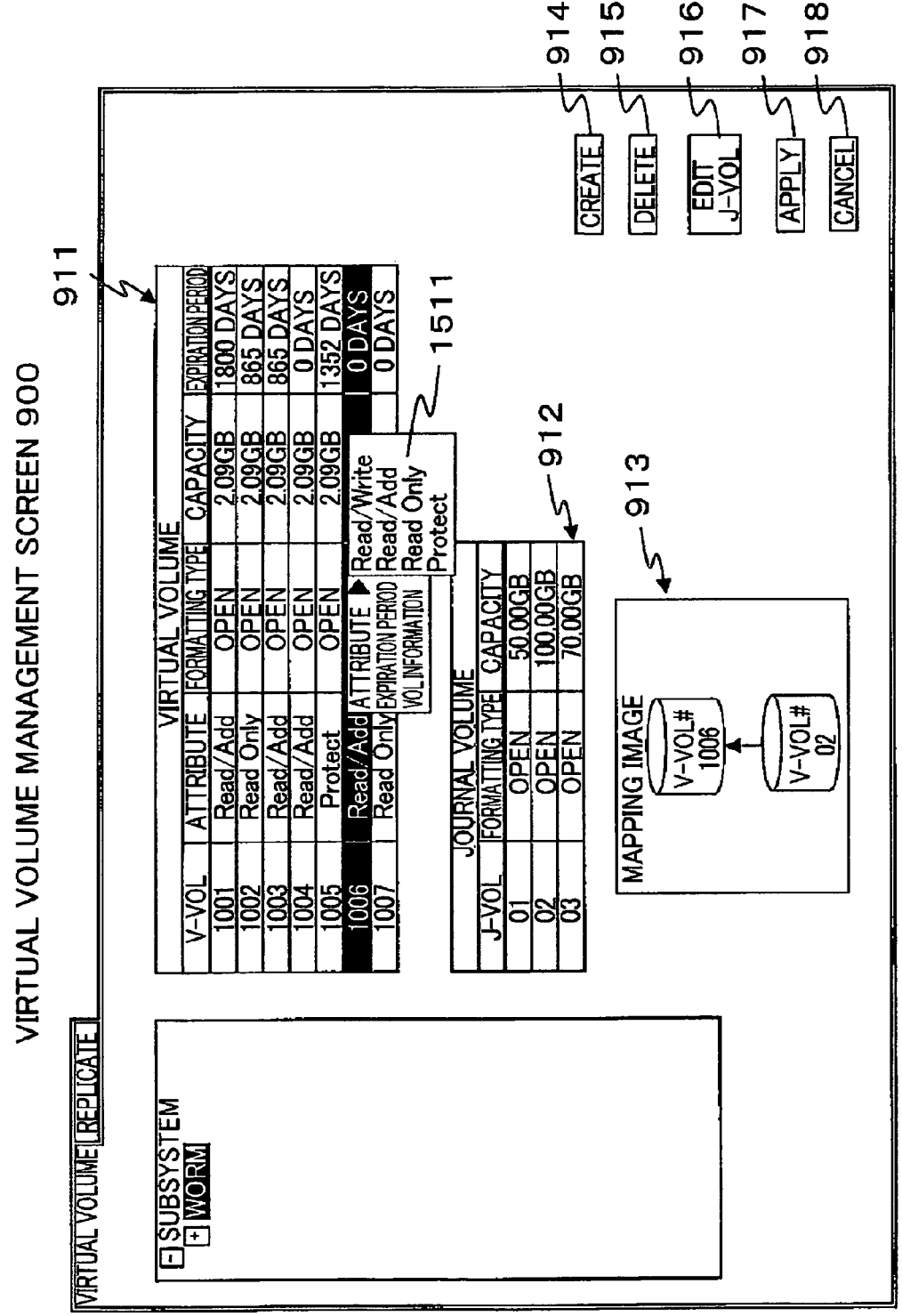

[Fig. 16]
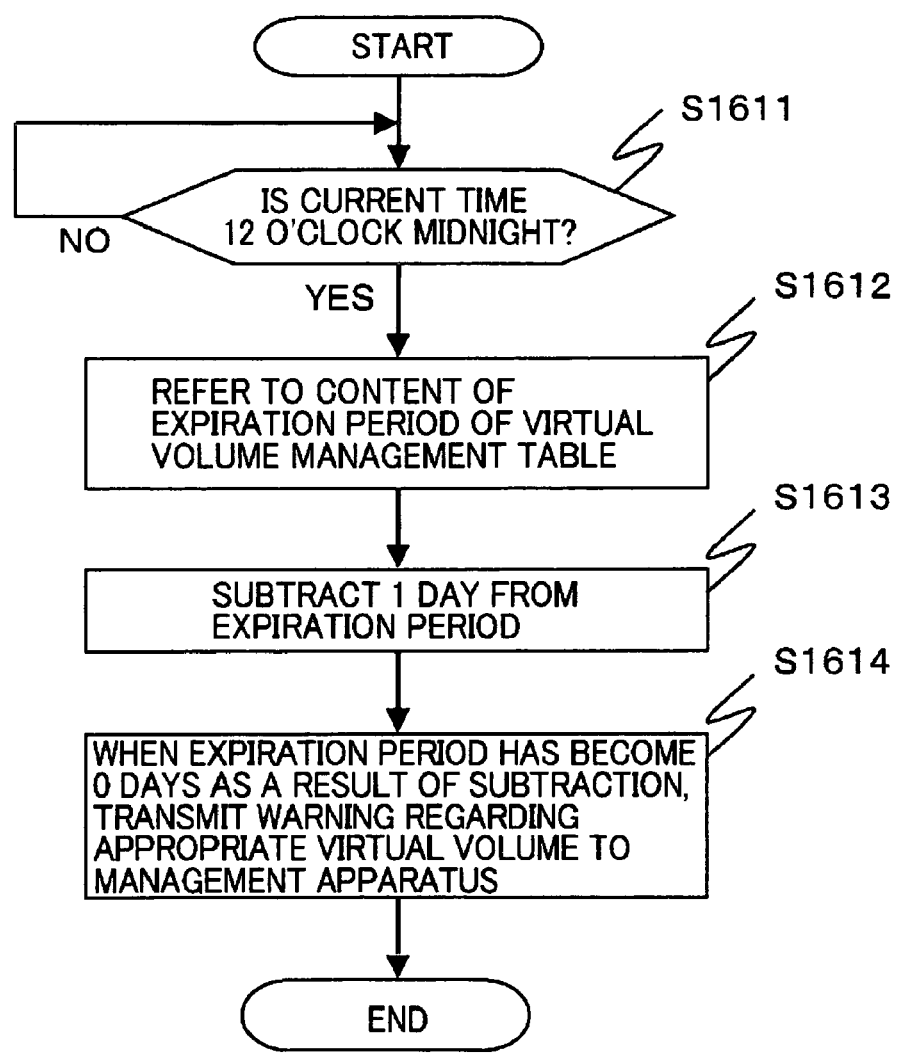

[Fig. 17]
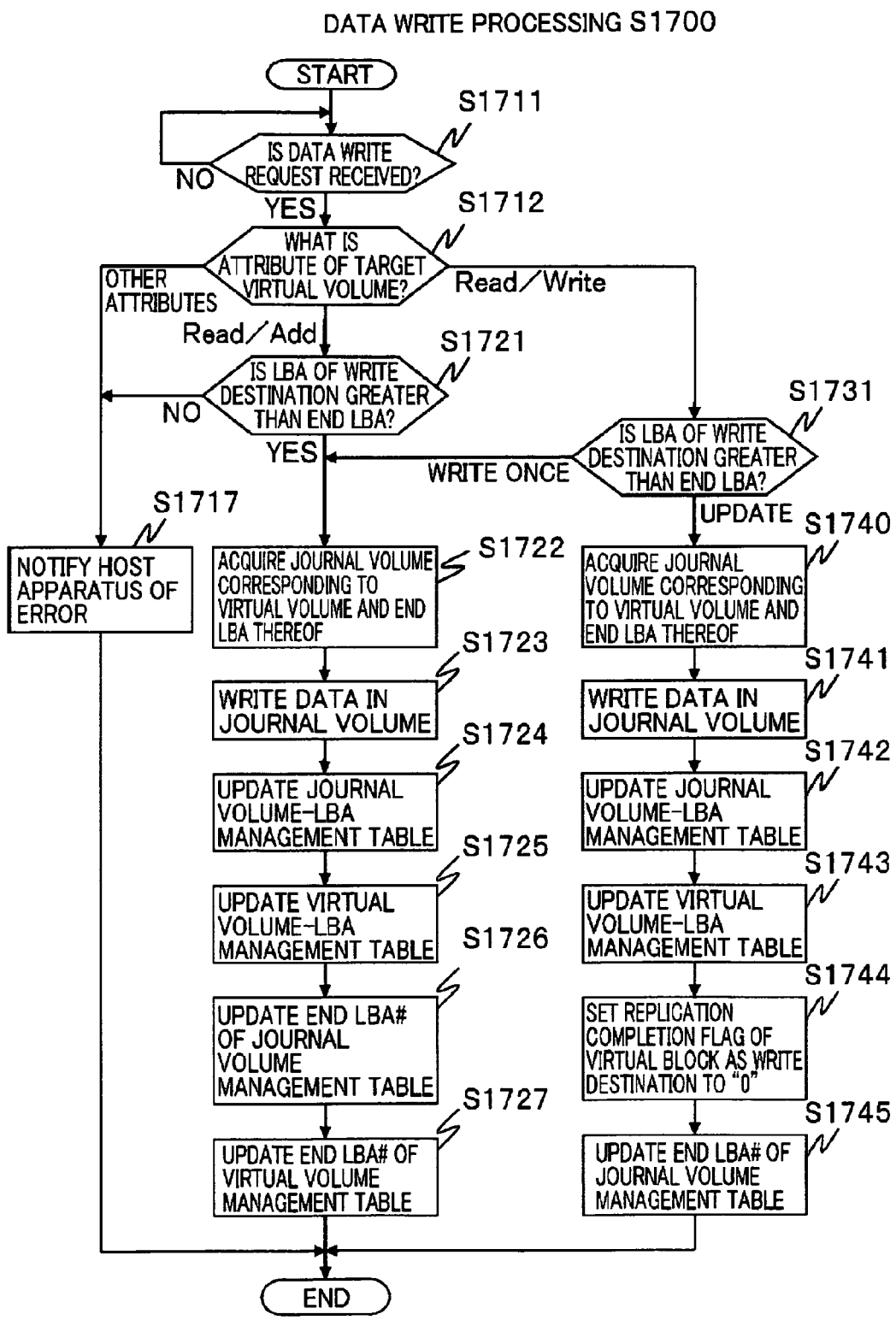

[Fig. 18]
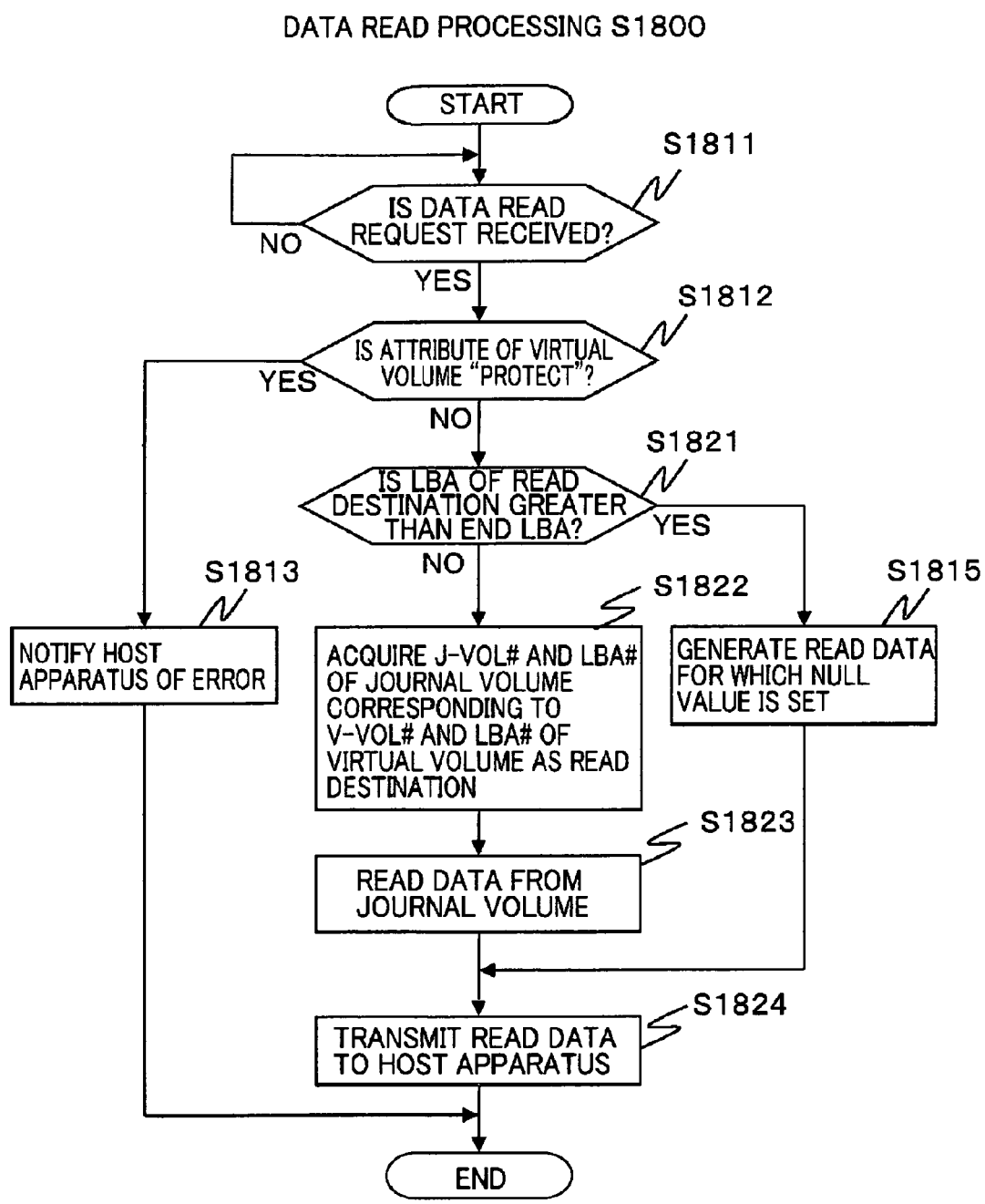

[Fig. 19]
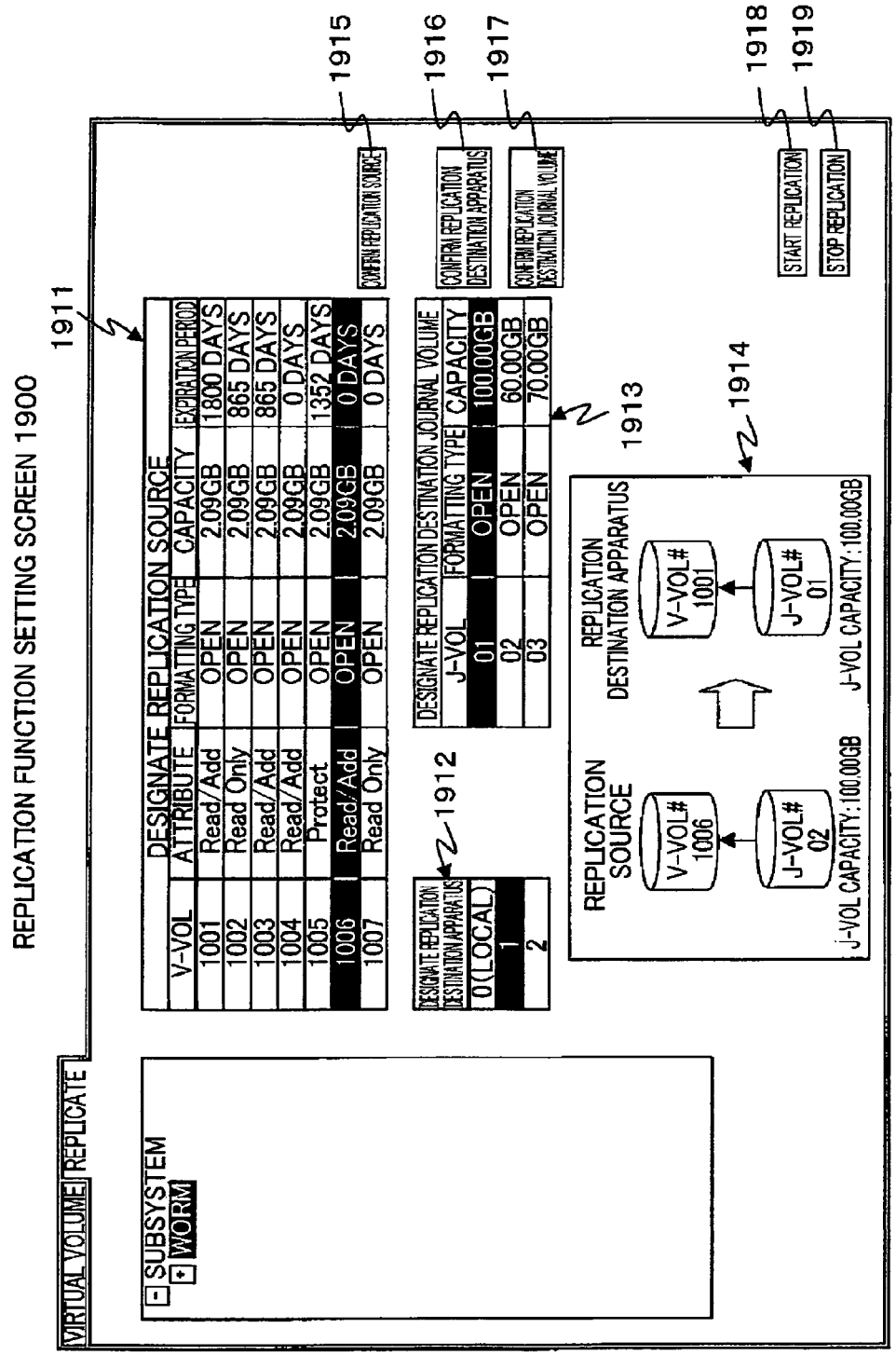

[Fig. 20]
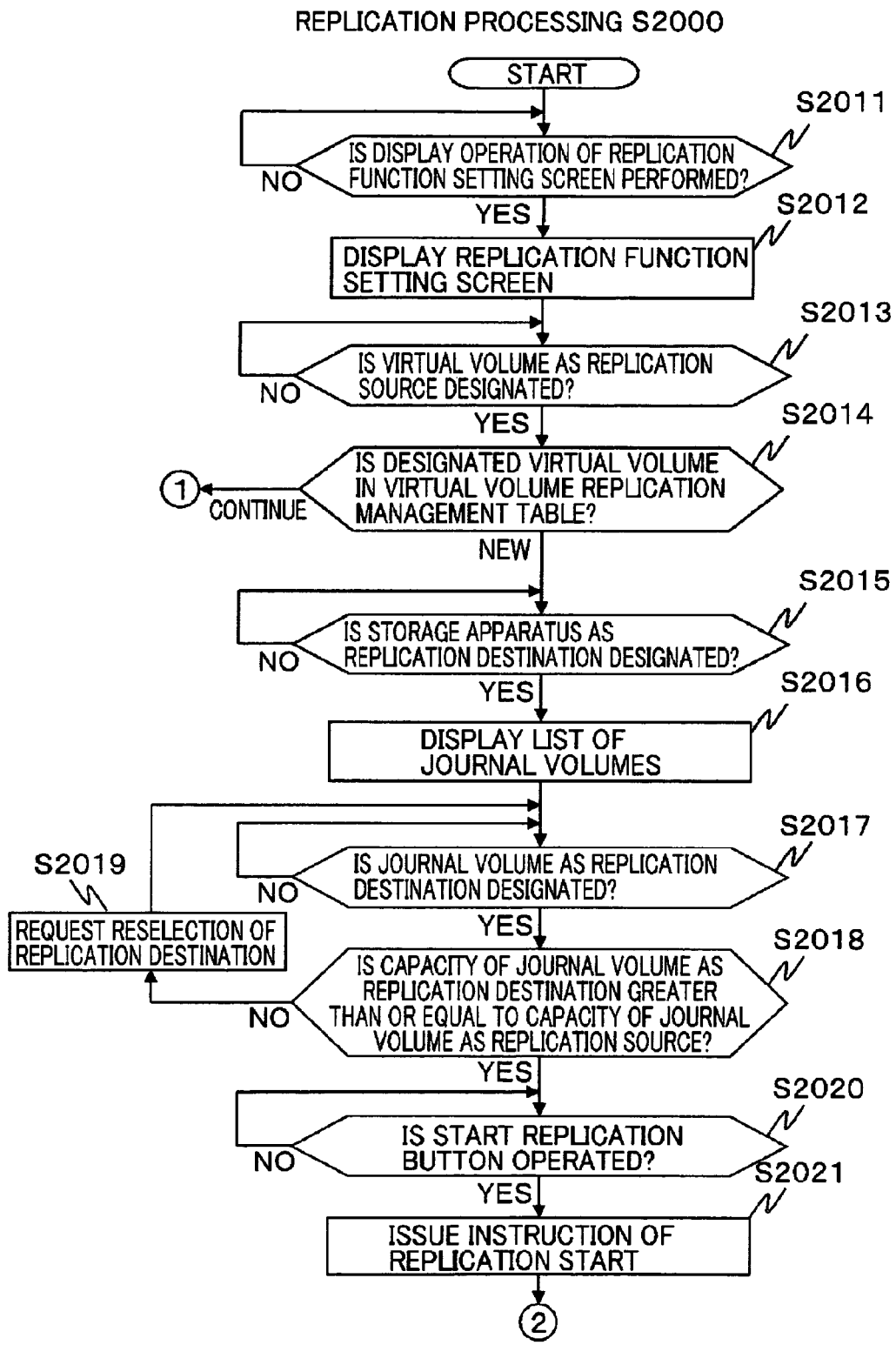

[Fig. 21]
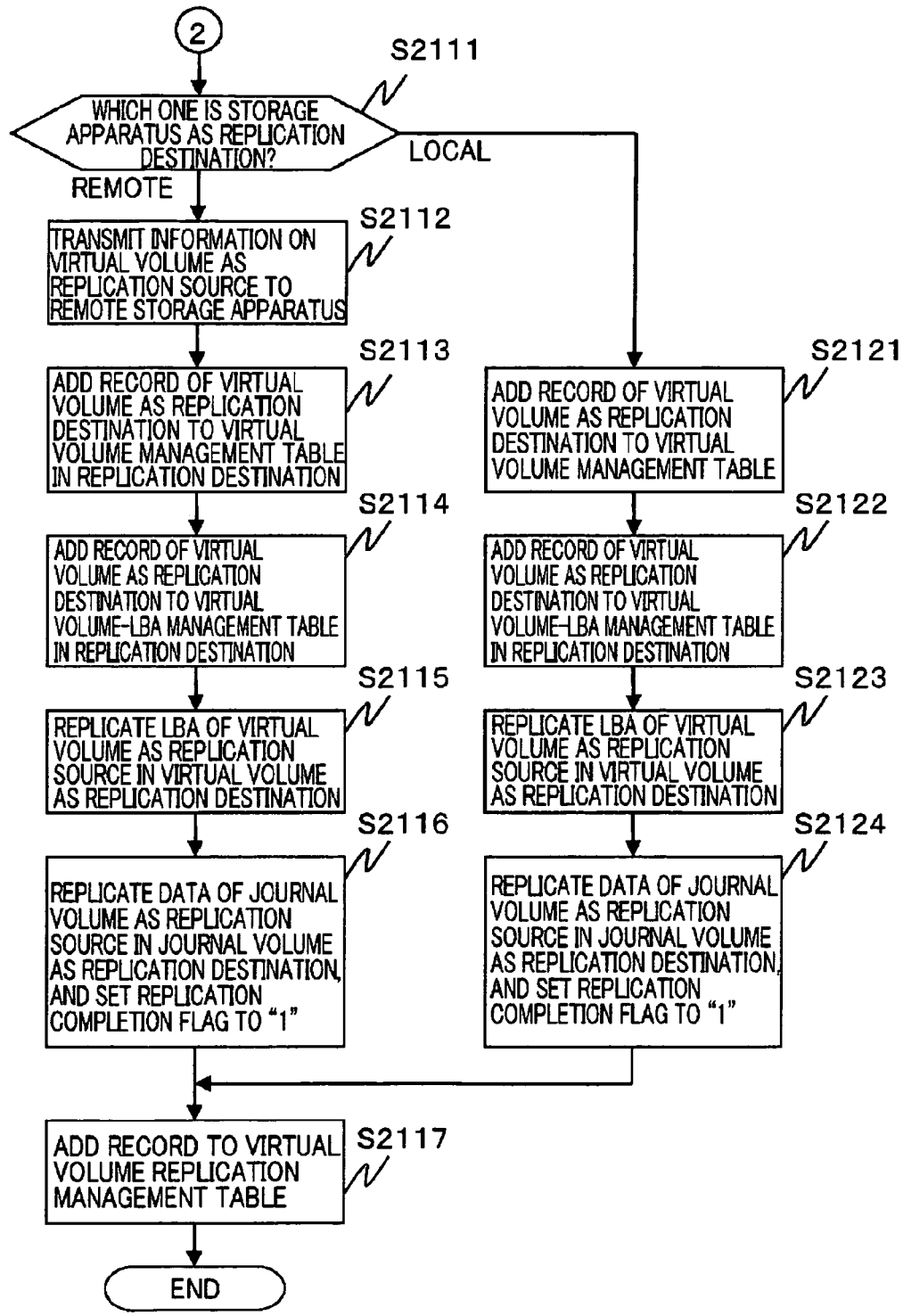

[Fig. 22]
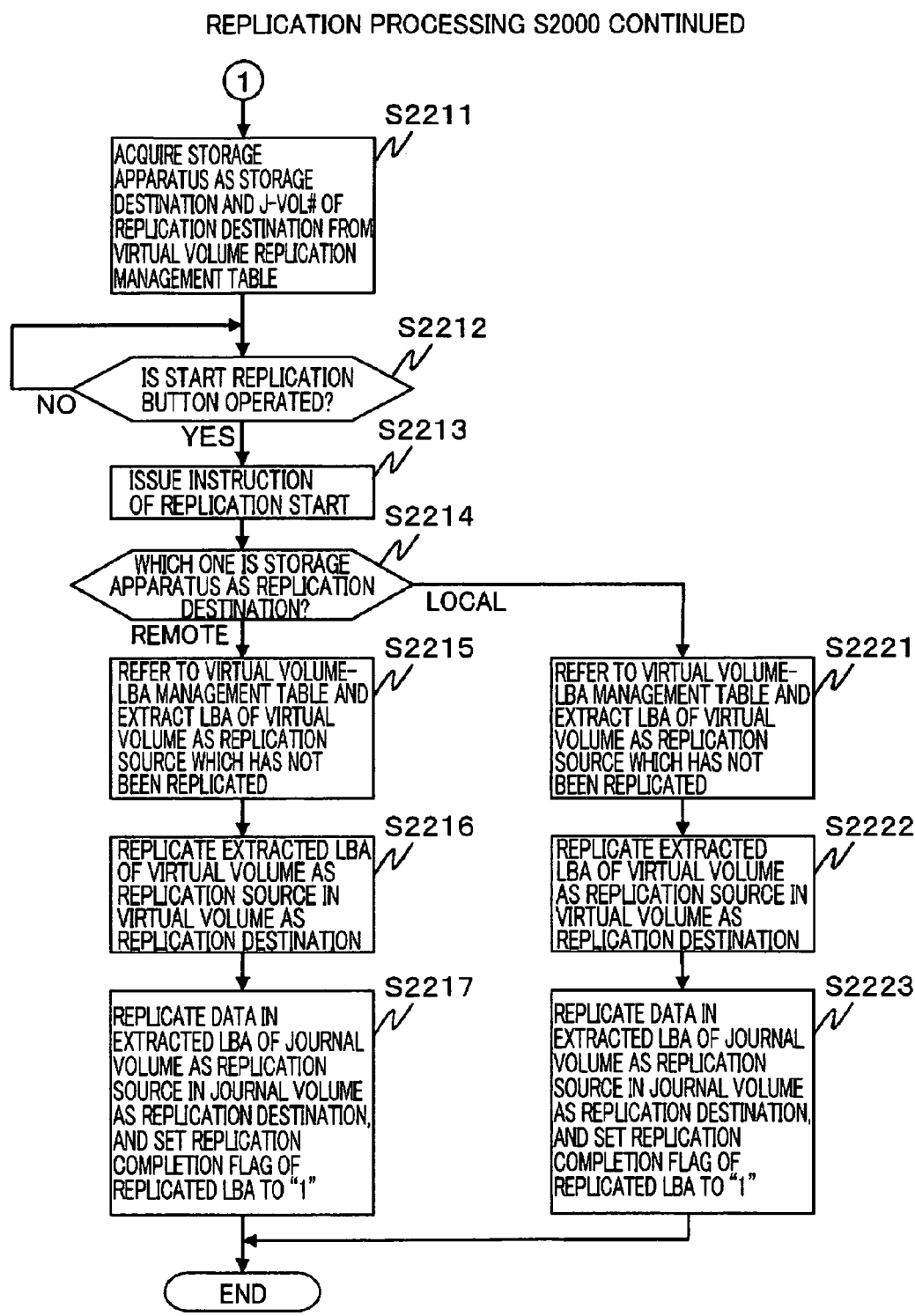

US 8,046,531 B2

STORAGE APPARATUS, MANAGEMENT APPARATUS, AND METHOD OF CONTROLLING STORAGE APPARATUS

TECHNICAL FIELD

The present invention relates to a storage apparatus, a management apparatus, and a method of controlling a storage apparatus, and particularly relates to a technique for protecting data already written without fail while achieving effective use of a storage resource.

BACKGROUND ART

In recent years, it is becoming important that juristic acts, financial reports, and the like have no fraudulence, i.e., tampering of data is prevented, in terms of the J-SOX (Sarbanes-Oxley) act, internal control, and the like. Accordingly, higher security is required for data handled by organizations such as corporations.

Concerning a security technique, Patent Citation 1, for example, describes that a tampering prevention attribute and an access authority attribute representing a deletion prohibition period are held as attributes and that the attributes are checked at the time of a data update request or a deletion request, in order to prevent fraudulent or erroneous update of data intended to be non-updatable by a person to which an update authority has been transferred or a person impersonating such a person.

Patent Citation 2 describes a technique for effectively using the capacity of a storage system in such a way that: an access control attribute is set for an arbitrary storage area of the storage system; and when an access request is received from a host computer, the access is not executed on condition that an access target according to the access request includes a predetermined storage area and that the access according to the access request is prohibited in accordance with the access control attribute set for the predetermined storage area.

Patent Citation 3 describes a technique for monitoring and archiving long term data regarding a storage system using a WORM (Write Once Read Many) storage medium in such a way that: a write-protection area is identified by using a volume ID and a start offset and an end offset of a protection area of a volume; and when an offset instructed by a write request of a host corresponds to one of the write-protection areas, the write request is ignored or an error message is returned.

Patent Citation 4 discloses a technique in view of following problems: WORM cannot be applied to a new file or a file during addition until all writings of data have been completed and the content of the file has been confirmed, so that data cannot be guaranteed for a file in which the content is not confirmed, e.g., a file during writing; whether or not WORM is to be applied to a file is managed in volume units, which is not user-friendly; whether or not WORM is to be applied is determined for the whole file, so that WORM cannot be applied to a part of data of a file. Patent Citation 4 describes that, when a write request with respect to a file stored in a storage apparatus is received from a client computer: an object management table of the target file is referred to; a WORM attribute of the file is checked; whether or not a range to be written is set as a WORM range is checked; and execution of the writing to the target file is performed on condition that the write range is not set as the WORM range, or update of a WORM range management table and setting for applying WORM to written data are performed on condition that WORM is set for the data to be written.

[Patent Citation 1]
Japanese Patent Application Laid-open Publication No. 2004-86872
[Patent Citation 2]
Japanese Patent Application Laid-open Publication No. 2006-127106
[Patent Citation 3]
Japanese Patent Application Laid-open Publication No. 2005-267602
[Patent Citation 4]
Japanese Patent Application Laid-open Publication No. 2006-92276

DISCLOSURE OF INVENTION

Technical Problem

A storage area (hereinafter referred to as "volume") provided by a storage apparatus may be operated as a volume for which update writing is prohibited and only write once is allowed (hereinafter a file operated in this manner is referred to as "journal volume"), and a write-protection attribute may be settable for the journal volume, to prevent an update of the journal volume.

In such a storage apparatus, if the protection of data already written in the journal volume is prioritized and consequently the protection attribute is set for the journal volume with a plenty of unused area, write once cannot be performed and the effective use of the storage resource cannot be achieved. By contrast, if the effective use of the storage resource is prioritized, the data written in the journal volume cannot be protected until the unused area is thoroughly used up. Hence, in the operation of the journal volume, a user needs to select whether to prioritize the protection of the data or the effective use of the storage resource.

The present invention has been made in view of such a problem, and an object is to provide a storage apparatus, a management apparatus, and a method of controlling a storage apparatus that are capable of protecting already written data without fail while achieving effective use of a storage resource.

Technical Solution

One aspect of the present invention for solving the above-mentioned and other problems provides a storage apparatus including: a communication interface that receives an I/O request sent from a host apparatus; a storage device controller that performs writing and reading of data with respect to a storage device; a cache memory that stores data to be written in the storage device or data read from the storage device; a journal volume controller that provides a journal volume operated as a volume for which update writing is prohibited and write once is permitted, on the basis of a storage area provided by the storage device; and a virtual volume controller that provides a virtual volume as a volume accessible from the host apparatus, the journal volume 512 being an entity of the virtual volume, and the virtual volume being a volume for which an attribute (Read/Add) permitting only reading and write once is settable.

According to the present invention, the virtual volume is provided as the volume accessible from the host apparatus, and the attribute (Read/Add) that permits only reading and write once is settable for the virtual volume. Therefore, regarding the virtual volume for which the attribute is set, only reading is allowed for data already written in the virtual volume, and write once is also allowed. As described above, according to the present invention, both effective use of a storage resource and protection of data can be achieved. Since the journal volume as the substance of the virtual volume is hidden from the host apparatus, security is ensured in this respect as well.

Another aspect of the present invention provides the storage apparatus further including: a control processor that performs data transfer between the communication interface, the storage device controller, and the cache memory, wherein the virtual volume controller provides the virtual volume as a volume for which an attribute (Read/Write) that enables reading and writing is further settable in addition to the attribute (Read/Add), and adds data to be written by the update writing to the journal volume as the entity of the virtual volume when update writing is performed on a virtual volume according to the I/O request after the attribute set for one of the virtual volumes has been changed from the attribute (Read/Add) that permits only reading and write once to the attribute (Read/Write) that enables reading and writing.

According to the present invention, when the update writing is performed on the virtual volume according to the I/O request after the attribute set for the virtual volume has been changed from the attribute (Read/Add) that permits only reading and write once to the attribute (Read/Write) that permits reading and writing, the data to be written by the update writing is added to the journal volume as the substance of the virtual volume. As described above, according to the present invention, update writing in the journal volume is prohibited, and thus the data already written in the journal volume can be protected without fail.

Another aspect of the present invention provides the storage apparatus, wherein the virtual volume controller configures one journal volume as an entity of a plurality of the virtual volumes.

According to the present invention, the plurality of virtual volumes can be configured by using one journal volume. Therefore, an effective use of the storage resource (storage area of the journal volume) can be achieved.

Another aspect of the present invention provides the storage apparatus, wherein the virtual volume controller provides the virtual volume controller provides the virtual volume as a volume for which at least one of an attribute (Read Only) that enables only reading, an attribute (Protect) that prohibits an access to the virtual volume, and an attribute (Read/Write) that enables reading and writing is further settable in addition to the attribute (Read/Add).

As described above, the virtual volume can be set, for example, to have the attribute (Read Only) that enables only reading, the attribute (Protect) that prohibits the access to the virtual volume, the attribute (Read/Write) that enables reading and writing, or the like other than the attribute (Read/Add). Therefore, the virtual volume can be operated flexibly in the actual operation, and an effective use of the storage resource and ensuring security can further be achieved.

Another aspect of the present invention provides the storage apparatus, further including a virtual volume replication controller that replicates one of the virtual volumes as another one of the virtual volumes.

According to the present invention, a replication (backup) of the virtual volume can be acquired by using volumes of the same type being the virtual volumes as the replication source and the replication destination. Therefore, the mechanism of the replication management for the virtual volume can easily be implemented.

Another aspect of the present invention provides the storage apparatus, wherein the storage apparatus stores presence or absence of a replica for each block of the virtual volume, and the virtual volume replication controller performs replication of only the block on which a replica is not acquired when replication is performed again for the virtual volume on which replication has been performed in the past.

As described above, when the replication is performed again on the virtual volume for which replication has been performed in the past, the replication of only the block for which the replica is not acquired is performed without repeatedly transferring data, and the replication can hence be performed efficiently and promptly.

Another aspect of the present invention provides a management apparatus that is communicatively coupled to the above-mentioned storage apparatus and provides a function for a user to manage the virtual volume, wherein the management apparatus outputs information showing that the replica has not been acquired, when one of the virtual volumes is to be deleted and the replica of the virtual volume has not been acquired.

As described above, since the user or the like is warned when the virtual volume for which the replica has not been acquired is to be deleted, an erroneous deletion of the virtual volume for which the replica has not been acquired can be prevented without fail.

Another aspect of the present invention provides a management apparatus coupled to the storage apparatus according to claim 1 and provides a function for a user to manage the virtual volume, the management apparatus comprising a virtual volume management part that provides a function for a user to change the attribute set for the virtual volume, wherein the virtual volume management part manages an expiration period of a setting of the virtual volume for which the attribute (Read/Add) is set, prohibits a change from the attribute (Read/Add) to another attribute before end of the expiration period, and enables a setting of the attribute (Read/Add) after the expiration period.

According to the present invention, when the attribute (Read/Add) is set for the virtual volume, changing to another attribute is prohibited until the set expiration period expires. Therefore, the data written in the virtual volume can be protected without fail at least within the expiration period.

Another aspect of the present invention provides a management apparatus that is communicatively coupled to the above-mentioned storage apparatus and provides a function for a user to manage the virtual volume, the management apparatus including a virtual volume management part that provides a function for the user to change the attribute set for the virtual volume, wherein the virtual volume management part does not permit a change to an attribute that may cause change in data already written in the virtual volume when the user attempts to change the attribute, of the virtual volume for which the attribute (Read/Add) is set, to another attribute.

According to the present invention, when the user attempts to change the attribute of the virtual volume to another attribute, the change to an attribute that may cause change in the data already written in the virtual volume is not permitted. Therefore, the data already written in the virtual volume can be protected without fail.

Another aspect of the present invention provides a management apparatus that is that is communicatively coupled to the above-mentioned storage apparatus and provides a function for a user to manage the virtual volume, the management apparatus including a virtual volume management part that provides a function for the user to change the attribute set for the virtual volume, wherein the virtual volume management part does not permit a change of the attribute when changing the attribute of the virtual volume, the virtual volume is reserved by processing of the I/O request.

According to the present invention, the change of the attribute cannot be performed when the virtual volume is reserved by the processing of the I/O request, and this can prevent inconsistency or the like in data due to a conflict between the I/O processing and the processing for the attribute change.

Other problems and solutions therefor disclosed in the present application shall become clear from the section of the embodiments of the present invention and the drawings.

Advantageous Effects

According to the present invention, data already written in the storage apparatus can be protected without fail while effective use of the storage resource is achieved.

BRIEF DESCRIPTION OF DRAWINGS

FIG. 1 is a view showing a configuration of a storage system 1.

FIG. 2A is a view showing a hardware configuration of a communication interface 11.

FIG. 2B is a view showing a hardware configuration of a control processor 12.

FIG. 2C is a view showing a hardware configuration of a disk controller 13.

FIG. 3 is a view showing one example of a computer (information apparatus) that can be used as a management apparatus 3.

FIG. 4A is a view showing functions of the management apparatus 3.

FIG. 4B is a view showing functions of a storage apparatus 10 and data managed by the storage apparatus 10.

FIG. 5 is a view showing relations among a free volume 511, a journal volume 512, and a virtual volume 513.

FIG. 6A is a view showing one example of a virtual volume management table 421.

FIG. 6B is a view showing one example of a journal volume management table 422.

FIG. 6C is a view showing one example of a virtual volume-LBA management table 423.

FIG. 6D is a view showing one example of a journal volume-LBA management table 424.

FIG. 6E is a view showing one example of a virtual volume replication management table 425.

FIG. 7 is a flowchart illustrating journal volume setting processing S700.

FIG. 8 is a view showing one example of a journal volume setting screen 800.

FIG. 9 is a view showing one example of a virtual volume management screen 900.

FIG. 10 is a flowchart illustrating virtual volume creation processing S1000.

FIG. 11 is a view showing one example of a virtual volume creation screen 1100.

FIG. 12 is a flowchart illustrating virtual volume deletion processing S1200.

FIG. 13 is a view showing one example of a delete confirmation screen 1300.

FIG. 14 is a flowchart illustrating virtual volume attribute change processing S1400.

FIG. 15 is a view showing one example of the virtual volume management screen 900.

FIG. 16 is a flowchart illustrating expiration period subtraction processing S1600.

FIG. 17 is a flowchart illustrating data write processing S1700.

FIG. 18 is a flowchart illustrating data read processing S1800.

FIG. 19 is a view showing one example of a replication function setting screen 1900.

FIG. 20 is a flowchart illustrating replication processing S2000.

FIG. 21 is a flowchart illustrating the replication processing S2000.

FIG. 22 is a flowchart illustrating the replication processing S2000.

EMBODIMENTS OF INVENTION

Hereinafter, an embodiment will be described. FIG. 1 shows a configuration of a storage system 1 illustrated as the embodiment. As shown in FIG. 1, the storage system 1 is formed to include a host apparatus 2, a storage apparatus 10 that communicates with the host apparatus 2 via a communication network 5, and a management apparatus 3 communicatively coupled to the storage apparatus 10 via a LAN (local area network) or the like. Also, as shown in FIG. 1, one or more remote storage apparatuses 50 having a similar configuration to the storage apparatus 10 is communicatively coupled to the storage apparatus 10 via a communication network 6.

The communication networks 5 and 6 are, for example, a LAN, a SAN (storage area network), the Internet, a public communication network, or the like. The communications between the host apparatus 2 and the storage apparatus 10 are performed according to a protocol such as TCP/IP, Fibre Channel Protocol, FICON (registered trademark) (Fibre Connection), ESCON (registered trademark) (Enterprise System Connection), ACONARC (registered trademark) (Advanced Connection Architecture), FIBARC (registered trademark) (Fibre Connection Architecture), or the like.

The host apparatus 2 is an information apparatus (computer) using a storage area provided by the storage apparatus 10, and is, for example, a personal computer, a mainframe, an office computer, or the like. The host apparatus 2 transmits an I/O request to the storage apparatus 10 when accessing the storage area.

The storage apparatus 10 includes one or more communication interfaces (hereinafter referred to as "communication I/Fs 11"), one or more control processors 12 (micro processors), one or more disk controllers 13 (storage apparatus controllers), a cache memory 14, a shared memory 15, an internal switch 16, a storage device 17, and a maintenance device 18 (service processor).

Inside the storage apparatus 10, the communication I/F 11, the control processor 12, the disk controller 13, the cache memory 14, and the shared memory 15 are all communicatively coupled to each other via the internal switch 16.

The communication I/F 11 receives an I/O request (data write request, data read request, or the like) sent from the host apparatus 2, and transmits, to the host apparatus 2, a response (read data, read completion report, write completion report, or the like) of processing for the received I/O request. The communication I/F 11 has a function relating to protocol control for communicating with the host apparatus 2.

The control processor 12 performs processing relating to data transfer performed between the communication I/F 11, the disk controller 13, and the cache memory 14 in accordance with the I/O request received by the communication I/F 11. The control processor 12 performs, for example, delivery of data (data read from the storage device 17 or data to be written in the storage device 17) between the communication I/F 11 and the disk controller 13 via the cache memory 14, and staging (reading of data from the storage device 17) or destaging (writing in the storage device 17) of data stored in the cache memory 14.

The cache memory 14 is configured by using a RAM (random access memory) or the like capable of high-speed access. The cache memory 14 stores, for example data to be written in the storage device 17 (hereinafter referred to as "write data") or data read from the storage device 17 (hereinafter referred to as "read data"). The shared memory 15 stores various information used to the control the storage apparatus 10.

The disk controller 13 performs communication with the storage device 17 when reading data from the storage device 17 or writing data in the storage device 17.

The switch 16 is, for example, a high-speed cross bar switch. Communication via the switch 16 is performed according to a protocol such as Fibre Channel, iSCSI (Internet Small Computer System Interface) or TCP/IP.

The storage device 17 is configured by using a storage medium such as a hard disk drive 171. The hard disk drive 171 is controlled according to a control scheme (e.g., RAID levels of 0, 1, 5, 6, or the like) of RAID (Redundant Arrays of Inexpensive (or Independent) Disks). The storage device 17 provides a storage area in units of an LDEV (logical device) configured by using a storage area (e.g., storage area of a RAID group (parity group)) provided according to RAID.

Note that the storage device 17 may be configured by using another storage media such as an SSD (solid state drive). The unit of the storage area provided by the storage device 17 is not limited to the logical device (LDEV).

FIG. 2A shows a hardware configuration of the communication I/F 11. As shown in FIG. 2A, the communication I/F 11 includes an external communication interface (hereinafter referred to as "external communication I/F 111"), a processor 112, a memory 113, and an internal communication interface (hereinafter referred to as "internal communication I/F 114"). The external communication I/F 111 is, for example, a NIC (network interface card) or a HBA (host bus adaptor). The processor 112 is a CPU (central processing unit), an MPU (micro processing unit), or the like. The memory 113 is a RAM or a ROM (read only memory). The internal communication I/F 114 performs communication with the control processor 12, the disk controller 13, the cache memory 14, and the shared memory 15 via the internal switch 16.

FIG. 2B shows a hardware configuration of the control processor 12. As shown in FIG. 2B, the control processor 12 includes an internal communication interface (hereinafter referred to as "internal communication I/F 121"), a processor 122, a memory 123, and an RTC (real time clock) 124. The internal communication I/F 121 performs communication with the communication I/F 11, the disk controller 13, the cache memory 14, and the shared memory 15 via the internal switch 16. The processor 122 is a CPU, an MPU, a DMA (direct memory access), or the like. The memory 113 is a RAM or a ROM. The RTC 124 provides information relating to the date and time such as the current date and time.

FIG. 2C shows a hardware configuration of the disk controller 13. As shown in FIG. 2C, the disk controller 13 includes an internal communication interface (hereinafter referred to as "internal communication I/F 131"), a processor 132, a memory 133, and a disk interface (hereinafter referred to as "disk interface 134"). The internal communication I/F 131 communicates with the communication I/F 11, the control processor 12, the cache memory 14, the shared memory 15, and the like via the internal switch 16. The processor 132 is a CPU, an MPU, or the like. The memory 133 is a RAM or a ROM. The disk interface 134 performs communication with the storage device 17.

The maintenance device 18 is a computer that includes a CPU and a memory and performs control or state monitoring of each of components of the storage apparatus 10. The maintenance device 18 is communicatively coupled to the communication I/F 11, the control processor 12, the disk controller 13, the cache memory 14, the shared memory 15, the switch 16, and the like via the internal switch 16 or other communication means such as the LAN (local area network). The maintenance device 18 acquires operation information or the like as needed from the components of the storage apparatus 10 and provides the operation information or the like to the management apparatus 3. Also, the maintenance device 18 performs setting, control, maintenance (introduction or update of software), or the like in accordance with information sent from the management apparatus 3.

The management apparatus 3 is, for example, a personal computer or an office computer. The management apparatus 3 may be integral with (be mounted in the same housing as that of) the storage apparatus 10. The management apparatus 3 is communicatively coupled to the maintenance device 18 via the LAN or the like. The management apparatus 3 includes a user interface using a GUI (graphical user interface), CLI (command line interface), or the like for control and monitoring of the storage apparatus 10.

FIG. 3 shows one example of a computer (information apparatus) that can be used as the management apparatus 3. As shown in FIG. 3, this computer 30 includes a CPU 31, a volatile or nonvolatile memory 32 (RAM or ROM), a storage device 33 (e.g., a hard disk or a solid state drive (SSD)), an input device 34 such as a keyboard or a mouse, an output device 35 such as a liquid crystal monitor or a printer, a communication interface (hereinafter referred to as "communication I/F 36") such as a NIC or HBA, and an RTC 37.

FIG. 4A shows functions of the management apparatus 3. Of these, a virtual volume management part 411 performs setting, control, and management of a virtual volume to be described later. A journal volume setting part 412 performs setting of a journal volume to be described later. A replication function setting part 413 performs processing relating to the setting of a replication function to be described later. Note that these functions are implemented by executing a program stored in the memory 32 by the CPU 31 of the management apparatus 3.

FIG. 4B shows functions of the storage apparatus 10 and data managed by the storage apparatus 10.

In FIG. 4B, a virtual volume controller 415 performs management of a virtual volume 513 and processing relating to an I/O request to the virtual volume 513. A virtual volume replication controller 416 performs management of a replica (backup) of data stored in the virtual volume 513 and processing relating to the replication. A journal volume controller 417 performs management of a journal volume 512 and processing relating to an I/O request to the journal volume 512. A free volume management part 418 performs management of a free volume to be described later.

The functions described above are implemented by executing a program stored in the memory 123 by the processor 122 of the control processor 12. In this embodiment, each of the above functions is implemented by the control processor 12, and the program and data for implementing each of the functions are stored in the memory 123 of the control processor 12 or the shared memory 15. Note that the storage location of the program and the data serving as entities in implementing each of the functions are not limited to this. For example, the communication I/F 11 or the disk controller 13 may be the entity for implementing the functions, or the program and data may be stored in the memory 113 of the communication I/F 11 or in the memory 133 of the disk controller 13.

In FIG. 4B, a virtual volume management table 421 manages information relating to the virtual volume 513. A journal volume management table 422 manages information relating to the journal volume 512. A virtual volume-LBA management table 423 manages information relating to an LBA (logical block address) (hereinafter, a value of the LBA will be referred to as "LBA#") of the virtual volume 513. A journal volume-LBA management table 424 manages information relating to an LBA of the journal volume 512. A virtual volume replication management table 425 manages information relating to a replica of the virtual volume 513. A free volume management table 426 manages information relating to the free volume.

FIG. 5 shows relations among the free volumes 511, the journal volumes 512, and the virtual volumes 513. Each of the free volumes 511 is a storage area provided by the storage device 17, and is a storage area capable of configuring the journal volume 512. In this embodiment, the free volume 511 is provided by an LDEV 172 (logical device) provided by the storage device 17, and the free volume 511 is configured by one LDEV 172. However, how the free volume 511 is configured is not limited to this.

The journal volume 512 is a storage area configured by using the free volume 511. The host apparatus 2 cannot directly access the journal volume 512. The storage area of the journal volume 512 is divided and managed in units of a plurality of storage areas (hereinafter referred to as "journal blocks"). The journal volume 512 is a storage area operated to allow only reading and write once of data, and data to be newly written is always written in a free journal block of the journal volume 512. Note that, in this embodiment, one journal volume 512 is configured by using one free volume 511, but the configuration mode of the journal volume 512 is not limited to this.

The virtual volume 513 is configured by using one or more journal volumes 512. Since one journal volume 512 can be configured by using two or more virtual volumes 513 as shown in FIG. 5, the storage area provided by the storage device 17 can be used effectively. The host apparatus 2 can directly access the virtual volume 513. As shown in FIG. 4B, the host apparatus 2 accesses the virtual volume 513 by, for example, designating a port number (number of an input port of the communication I/F 11, which is hereinafter referred to as "port#") of the storage apparatus 10 and an identifier (hereinafter referred to as "V-VOL#") assigned to each virtual volume 513.

The storage area of the virtual volume 513 is divided and managed in units of a plurality of storage areas (hereinafter referred to as "virtual blocks"). In this embodiment, the size of the virtual block and the size of the journal block are identical. The host apparatus 2 can directly access the virtual volume 513 within a range of the attribute set for the virtual volume 513. The types of the attribute that can be set for the virtual volume 513 are as follows.

Read/Add: Reading of data and write once of data are allowed (update (overwrite) is not allowed)

Read Only: Only reading of data is allowed (write once and update (overwrite) are not allowed)

Protect: Access is not allowed

Read/Write: Reading of data and writing of data are allowed (update (overwrite) is allowed)

As described above, various attributes can be set for the virtual volume 513. Therefore, the user can operate the virtual volume 513 flexibly in line with the operated entity.

FIG. 6A shows one example of the virtual volume management table 421. As shown in FIG. 6A, the virtual volume management table 421 is formed to include a plurality of records having items of a V-VOL# 4211, a formatting type 4212, a capacity 4213, an attribute 4214, an expiration period 4215, and an end LBA# 4216.

In the V-VOL# 4211, an identifier (V-VOL#) of a virtual volume 513 is stored. In the formatting type 4212, a formatting type (e.g., a character string "OPEN" in the case of an open system formatting type or a character string "MAINFRAME" in the case of a mainframe formatting type) for the virtual volume 513 is stored. In the capacity 4213, the capacity of the virtual volume 513 is stored. In the attribute 4214, the attribute currently set for the virtual volume 513 is set. In the expiration period 4215, an original guarantee period (period for which written data is guaranteed to be not overwritten) requested for the virtual volume 513 is stored.

In the end LBA# 4216, an address (LBA#) of the last block of the virtual volume 513 in which data is currently written is set. Note that, in this embodiment, data is written in the virtual volume 513 in ascending order of the block address.

FIG. 6B shows one example of the journal volume management table 422. As shown in FIG. 6B, the journal volume management table 422 is formed to include a plurality of records having items of a J-VOL# 4221, a formatting type 4222, a capacity 4223, and an end LBA# 4224 of a journal volume 512.

Of these, in the J-VOL# 4221, an identifier (hereinafter referred to as "J-VOL#") of a journal volume 512 is stored. In the formatting type 4222, a formatting type (e.g., the character string "OPEN" in the case of an open system formatting type and the character string "MAINFRAME" in the case of a mainframe formatting type) for the journal volume 512 is stored. In the capacity 4223, the capacity of the journal volume 512 is stored. In the end LBA# 4224, an address (LBA#) of the last block of the journal volume 512 in which data is currently written is stored. Note that, in this embodiment, data is written in the journal volume 512 in ascending order of the block address.

FIG. 6C shows one example of the virtual volume-LBA management table 423. As shown in the drawing, the virtual volume-LBA management table 423 is formed to include a plurality of records having items of a V-VOL# 4231, an LBA# 4232 of the virtual block, a J-VOL# 4233, an LBA# 4234 of the journal block, and a replication completion flag 4235.

In the V-VOL# 4231, the V-VOL# is stored. In the LBA# 4232, the LBA# of the virtual block of the virtual volume 513 is stored. In the J-VOL# 4233, the J-VOL# of a journal volume 512 corresponding to the virtual volume 513 is stored. In the LBA# 4234, the LBA# of the journal block of the above-mentioned journal volume 512 is stored. In the replication completion flag 4235, a flag is stored (i.e., "1" in the case where a replica has been made or "0" in the case where a replica has not been made) showing whether or not a backup of data is acquired (whether or not a replica has been made) for data stored in the virtual block.

FIG. 6D shows one example of the journal volume-LBA management table 424. As shown in FIG. 6D, the journal volume-LBA management table 424 is formed to include a plurality of records having items of a J-VOL# 4241, an LBA# 4242 of the journal block of the journal volume 512, and a time 4243.

In the J-VOL# 4241, the J-VOL# is stored. In the LBA# 4242, the LBA# of the journal block of the journal volume 512 is stored. In the time 4243, the date and time (time stamp) at which data has been written in the journal block is stored.

FIG. 6E shows one example of the virtual volume replication management table 425. The virtual volume replication management table 425 manages a correspondence between a virtual volume 513 as a replication source and a virtual volume 513 as a replication destination. As shown in the drawing, the virtual volume replication management table 425 is formed to include a plurality of records having: information of the replication source including a V-VOL# 4251 in which the V-VOL# of the virtual volume 513 as the replication source is stored, a J-VOL# 4252 in which the J-VOL# of the journal volume 512 configuring the virtual volume 513 as the replication source is stored, a formatting type 4253 in which the formatting type of the virtual volume 513 as the replication source is stored, and a capacity 4254 of the journal volume 512 configuring the virtual volume 513 as the replication source; and information of the replication destination including an apparatus# 4255 in which an apparatus number (i.e., 0 for the local storage apparatus 10 or a number other than 0 for the remote storage apparatus 50) of the (local or remote) storage apparatus as the replication destination is stored, a V-VOL# 4256 in which the V-VOL# of the virtual volume 513 as the replication destination is stored, a J-VOL# 4257 in which the J-VOL# of the journal volume 512 configuring the virtual volume 513 as the replication destination is stored, a formatting type 4258 in which the formatting type of the virtual volume 513 as the replication destination is stored, and a capacity 4259 of the journal volume 512 configuring the virtual volume 513 as the replication destination.

=Management of Virtual Volume=

Next, processing performed in the storage system 1 when the host apparatus 2 uses a virtual volume 513 will be described specifically. Note that, in the descriptions below, the letter "S" preceding a reference numeral indicates a step.

<Setting of Journal Volume>

The setting of the journal volume 512 is performed by an operation of the management apparatus 3 by the user (operator) of the storage apparatus 10. FIG. 7 is a flowchart illustrating processing (hereinafter referred to as "journal volume setting processing S700") performed mainly by the journal volume setting part 412 of the management apparatus 3 at the time of setting (addition or deletion) of the journal volume 512. Hereinafter, the journal volume setting processing 5700 will be described with reference to FIG. 7.

When a start operation of the journal volume setting processing S700 is performed (S711: YES), the journal volume setting part 412 acquires the journal volume management table 422 and the free volume management table 426 stored in the shared memory 15, from the storage apparatus 10 (S712). Subsequently, the journal volume setting part 412 displays a screen (hereinafter referred to as "journal volume setting screen 800") shown in FIG. 8 on the basis of the acquired content (S713).

As shown in FIG. 8, the journal volume setting screen 800 is provided with a display field 811 of journal volumes 512 currently set, a display field 812 of free volumes 511 currently existing, an add button 813, a delete button 814, a set button 815, and a cancel button 816.

When a user wishes to set the free volume 511 as the journal volume 512, the user selects a free volume 511 from the display field 812 and operates the add button 813. When a user wishes to cancel the setting of the journal volume 512, the user selects a journal volume 512 from the display field 811 and operates the delete button 814. When a user wishes to confirm the setting content, the user operates the set button 815. When a user wishes to stop setting the journal volume, the user operates the cancel button 816.

When detecting the operation of the set button 815 (S714: set), the journal volume setting part 412 adds a record corresponding to the content set in the journal volume setting screen 800 to the journal volume management table 422 of the storage apparatus 10 (S715).

<Management of Virtual Volume>

The management of the virtual volume 513 is performed by the operation of the management apparatus 3 by the user (operator) of the storage apparatus 10. FIG. 9 shows a screen (hereinafter referred to as "virtual volume management screen 900") displayed by the management apparatus 3 at the time of management of the virtual volume 513.

As shown in FIG. 9, the virtual volume management screen 900 is provided with a display field 911 of virtual volumes 513 currently set, a display field 912 of journal volumes 512 currently set, a display field 913 that visually displays the correspondence (mapping image) between the virtual volume 513 currently selected in the display field 911 and the journal volume 512 configuring the virtual volume 513, a create button 914, a delete button 915, an edit journal volume button 916, an apply button 917, and a cancel button 918.

<Creation of Virtual Volume>

FIG. 10 is a flowchart illustrating processing (hereinafter referred to as "virtual volume creation processing S1000") performed mainly by the virtual volume management part 411 of the management apparatus 3 when the user creates a virtual volume. Hereinafter, the virtual volume creation processing S1000 will be described with reference to FIG. 10.

When the create button 914 of the virtual volume management screen 900 is operated (S1011: YES), the virtual volume management part 411 acquires, from the storage apparatus 10, the journal volume management table 422 and the virtual volume-LBA management table 423 stored in the shared memory 15 of the storage apparatus 10 (S1012). Subsequently, the virtual volume management part 411 displays a screen (hereinafter referred to as "virtual volume creation screen 1100") shown in FIG. 11 on the basis of the acquired content (S1013).

As shown in FIG. 11, the virtual volume creation screen 1100 is provided with a set field 1111 for the V-VOL#, a set field 1112 for the formatting type, a set field 1113 for the capacity, a set field 1114 for the attribute, a set field 1115 for the expiration period, a set field 1116 for the journal volume 512, a create button 1121, and a cancel button 1122.

In the set field 1111 for the V-VOL#, the V-VOL# assigned to a virtual volume 513 to be created is set. In the set field 1112 for the formatting type, the formatting type of the virtual volume 513 to be created is set. In the set field 1113 for the capacity, the capacity of the virtual volume 513 to be created is set. In the set field 1114 for the attribute, the attribute of the virtual volume 513 to be created is set. In the set field 1115 for the expiration period, the expiration period of the virtual volume 513 to be created is set. In the set field 1116 for the journal volume 512, the J-VOL# of the journal volume 512 using the virtual volume 513 to be created is set.

When the content set in each of the fields described above are to be actually applied to the storage apparatus 10, the user operates the create button 1121. When the creation of the virtual volume 513 is to be stopped, the user operates the cancel button 1122.

When detecting the operation of the create button 1121 (S1014: create), the virtual volume management part 411 adds a record corresponding to the content set in the virtual volume creation screen 1100, i.e., a record of the virtual volume 513 to be created, to the virtual volume management table 421 of the storage apparatus 10 (S1015). Also, the virtual volume management part 411 adds a record of the virtual volume 513 to be created to the virtual volume-LBA management table 423 of the storage apparatus 10 (S1016).

Next, the virtual volume management part 411 refers to the virtual volume-LBA management table 423, and judges whether or not the journal volume 512 set in the virtual volume creation screen 1100 for the virtual volume 513 to be created is already used (is mapped) for another virtual volume 513 (S1017). If not used (S1017: NO), the processing is terminated. If used (S1017: YES), the processing proceeds to S1018.

In S1018, the virtual volume management part 411 acquires the journal volume-LBA management table 424 from the storage apparatus 10.

In S1019, the virtual volume management part 411 judges whether or not data is already written in the journal volume 512 set in the virtual volume creation screen 1100. When data is not yet written (S1019: NO), the processing is terminated. When data is already written (S1019: YES), the processing proceeds to S1020.

In S1020, the virtual volume management part 411 reflects the content of the journal volume-LBA management table 424 of the journal volume 512 set in the virtual volume creation screen 1100 to the record of the virtual volume-LBA management table 423 of the storage apparatus 10 added in S1016. More specifically, the virtual volume management part 411 replicates the content of the journal volume-LBA management table 424, in the J-VOL# 4233, the LBA# 4234, the V-VOL# 4231, and the LBM 4232 of the virtual volume-LBA management table 423.

<Deletion of Virtual Volume>

FIG. 12 is a flowchart illustrating processing (hereinafter referred to as "virtual volume deletion processing S1200") performed mainly by the virtual volume management part 411 of the management apparatus 3 when the user intends to delete the virtual volume 513 already created. Hereinafter, the virtual volume deletion processing S1200 will be described with reference to FIG. 12.

When the user selects a virtual volume 513 to be deleted from the display field 911 of the virtual volume 513 in the virtual volume management screen 900 shown in FIG. 9 and operates the delete button 915 (S1211: YES), the virtual volume management part 411 acquires, from the storage apparatus 10, the virtual volume-LBA management table 423 stored in the shared memory 15 of the storage apparatus 10 (S1212).

Next, the virtual volume management part 411 refers to the virtual volume-LBA management table 423, and judges whether "1" is set as all of the replication completion flags 4235 of the virtual block having written data in the virtual volume 513 selected as a deletion object by the user in the virtual volume management screen 900, i.e., whether or not data of the virtual volume 513 is replicated (S1213). If not replicated (not backed up), (S1213: NO), the processing proceeds to S1214. If replicated (S1213: YES), the processing proceeds to S1216.

In S1214, the virtual volume management part 411 displays a screen (hereinafter referred to as "delete confirmation screen 1300") exemplified in FIG. 13 to prompt the user for confirmation. If the user operates a delete button 1311 in the delete confirmation screen 1300 (S1215: delete), the processing proceeds to S1216. On the other hand, if a stop button 1312 is operated (S1215: stop), the processing is terminated. In this manner, when the virtual volume 513 for which a replica is not acquired is to be deleted, the user is warned. Therefore, an erroneous deletion of the virtual volume 513 for which a replica is not acquired can be prevented without fail.

In S1216, the virtual volume management part 411 deletes a record relating to the virtual volume 513 as the deletion object from the virtual volume management table 421 of the storage apparatus 10. Also, the virtual volume management part 411 deletes a record relating to the virtual volume 513 as the deletion object from the virtual volume-LBA management table 423 of the storage apparatus 10 (S1217).

<Attribute Change of Virtual Volume>

The user can use the virtual volume management screen 900 show in FIG. 9 to change the attribute of the virtual volume 513 already created. FIG. 14 is a flowchart illustrating processing (hereinafter referred to as "virtual volume attribute change processing S1400") performed mainly by the virtual volume management part 411 when the user changes the attribute of the virtual volume 513. Hereinafter, the virtual volume attribute change processing S1400 will be described with reference to FIG. 14.

When the user places the cursor on the virtual volume 513 of which the attribute is to be changed in the display field 911 of the virtual volume 513 in the virtual volume management screen 900 and performs a predetermined operation such as right-clicking of the mouse, an attribute change menu 1511 is displayed as shown in FIG. 15. When the user uses the attribute change menu 1511 to set the attribute after the change (S1411: YES), the virtual volume management part 411 acquires the virtual volume management table 421 stored in the shared memory 15 of the storage apparatus 10, from the storage apparatus 10 (S1412).

Next, the virtual volume management part 411 acquires the expiration period set for the virtual volume 513 of which the attribute is to be changed, from the expiration period 4215 of the virtual volume management table 421, and judges whether or not the acquired expiration period is 0 (S1413). If the expiration period is 0 (S1413: YES), the processing proceeds to S1416. If the expiration period is not 0 (S1413: NO), the processing proceeds to S1416. Note that subtraction is carried out in the content of the expiration period 4215 of the virtual volume management table 421 at a fixed time every day by the virtual volume controller 415 of the storage apparatus 10, until the content reaches zero days as described later.

In S1414, the virtual volume management part 411 judges whether or not the attribute set by the user is allowed to be changed, displays that the attribute change is not allowed (S1415) if the attribute change is not allowed (S1414: NO), and then the processing is terminated. In this manner, when the attribute (Read/Add) is set for the virtual volume 513, a change to another attribute is prohibited until the set expiration period expires. Therefore, data written in the virtual volume 513 can be protected without fail at least within the expiration period.

In S1414, when the attribute change is allowed (S1414: YES), the processing proceeds to S1416. The processing of S1414 and S1415 is performed to guarantee the original of the data stored in the virtual volume 513. That is, the virtual volume management part 411 does not permit an attribute change (e.g., a change from other attributes to "Read/Write") that prevents the original guarantee, and permits an attribute change (e.g., a change from "Read/Add" to "Read Only," from "Read/Add" to "Protect," from "Read Only" to "Protect," from "Protect" to "Read Only," or the like) that ensures the guarantee of the original. Therefore, the data already written in the virtual volume 513 can be protected without fail.

In S1416, the virtual volume management part 411 judges whether or not the virtual volume 513 for which the attribute is to be changed is secured (reserved) by another I/O processing by inquiring the storage apparatus 10. If reserved (S1416: YES), the virtual volume management part 411 displays that the attribute change is not allowed (S1417), and the processing is terminated. If not reserved (S1416: NO), the processing proceeds to S1418. In this manner, the change of the attribute cannot be performed when the virtual volume 513 is reserved by the processing of the I/O request, and this can prevent, without fail, inconsistency or the like in data from occurring due to a conflict between the I/O processing and the processing for the attribute change.

In S1418, the virtual volume management part 411 reserves the virtual volume 513 which is to be subject to change in an attribute. In S1419, the virtual volume management part 411 changes the attribute of the virtual volume management table 421 in the storage apparatus 10 into the attribute as set by a user. In S1420, the virtual volume management part 411 deletes the reserved virtual volume 513. (cancel of reservation).

<Subtraction Processing of Expiration Period>

As previously described, subtraction is carried out in the content of the expiration period 4215 of each virtual volume 513 in the virtual volume management table 421 at the fixed time every day by the virtual volume controller 415 of the storage apparatus 10, until the content reaches 0. FIG. 16 is a flowchart illustrating subtraction processing (hereinafter referred to as "expiration period subtraction processing S1600") of the content of the expiration period 4215 of each virtual volume 513 of the virtual volume management table 421 performed by the virtual volume controller 415. Hereinafter, the expiration period subtraction processing S1600 will be described with reference to FIG. 16.

When the current time is twelve o'clock midnight (fixed time) (S1611: YES), the virtual volume controller 415 acquires the virtual volume management table 421 and refers to the content of the expiration period 4215 of each virtual volume 513 (S1612). Subsequently, when the content of the expiration period 4215 is not 0, the virtual volume controller 415 subtracts 1 day from the current content of the expiration period 4215 of the virtual volume 513 and sets a result thereof to the expiration period 4215 (S1613).

When the content of the expiration period has become 0 days as a result of the subtraction of the content of the expiration period 4215, the virtual volume controller 415 notifies the management apparatus 3 of the V-VOL# of the virtual volume 513 (S1614). Note that the management apparatus 3 displays the notified V-VOL# to warn the user.

=I/O Processing with Respect to Virtual Volume=

Next, description will be given of processing performed when an I/O request with respect to a virtual volume 513 is transmitted from the host apparatus 2 to the storage apparatus 10.

<Data Write Request>

FIG. 17 is a flowchart illustrating processing (hereinafter referred to as "data write processing S1700") performed mainly by the virtual volume controller 415 of the storage apparatus 10 when a data write request with respect to a virtual volume 513 is transmitted from the host apparatus 2 to the storage apparatus 10. Hereinafter, the data write processing S1700 will be described with reference to the drawing. Note that the data write request is accompanied by data to be written (hereinafter referred to as "write data"), the V-VOL# of the virtual volume 513 as a write destination, and the LBA# of the write destination.

Upon receipt of the data write request for the virtual volume 513 (S1711: YES), the virtual volume controller 415 refers to the virtual volume management table 421 and judges the attribute currently set for the virtual volume 513 as the write destination (S1712). If it is judged that the attribute currently set for the virtual volume 513 as the write destination is "Read/Add" (S1712: Read/Add), the processing proceeds to S1721. If the attribute currently set is "Read/Write" (S1712: Read/Write), the processing proceeds to S1731. If the attribute currently set is neither "Read/Add" nor "Read/Write" (S1712: another attribute), an error is sent back to the host apparatus 2 (S1717), and the processing is terminated.

In S1721, the virtual volume controller 415 refers to the virtual volume management table 421 and judges whether or not the LBA# of the write destination designated by the data write request is greater than the LBA# set in the end LBA# 4216 of the virtual volume 513 of the write destination. When the LBA# of the write destination is less than or equal to the LBA# set in the end LBA# 4216 (S1721: NO), the processing proceeds to S1717 to notify the host apparatus 2 of an error, and the processing is terminated. Note that the reason for the error in this case is that the write request is judged as an update write request on an LBA# that is smaller than the end LBA# having written data. When the LBA# of the write destination is greater, the write request is a write once request (S1721: YES), and therefore the processing proceeds to S1722.

In S1722, the virtual volume controller 415 refers to the virtual volume-LBA management table 423 and the journal volume management table 422, and acquires the J-VOL# of a journal volume 512 corresponding to the V-VOL# of the virtual volume 513 as the write destination and the end LBA# of the journal volume 512. Subsequently, the virtual volume controller 415 writes the write data in a location at or following the acquired end LBA# of the journal volume 512 (S1723).

Next, the virtual volume controller 415 updates the content of the journal volume-LBA management table 424 and the content of the LBA# 4234 of the journal volume 512 of the virtual volume-LBA management table 423 (S1724 and S1725). Also, the virtual volume controller 415 updates the content of the end LBA# 4224 of the journal volume management table 422 (S1726), and updates the content of the end LBA# 4216 of the virtual volume management table 421 (S1727). Subsequently, the processing is terminated.

In S1731, the virtual volume controller 415 refers to the end LBA#. 4216 of the virtual volume management table 421, and judges whether or not data is already written in the LBA as the write destination of the data write request, i.e., whether this data write request indicates a write once or an update of the data. If the LBA# of the LBA as the write destination of the data write request is greater than a value of the end LBA# 4216, the virtual volume controller 415 judges that the write request is one for a write once (S1731: write once), and proceeds to S1722. On the other hand, if the LBA# of the LBA as the write destination of the data write request is less than or equal to the value of the end LBA# 4216, it is judged that the write request is one for update (S1731: update), and the processing proceeds to S1740.

In S1740, the virtual volume controller 415 refers to the virtual volume-LBA management table 423 and the journal volume management table 422, and acquires the J-VOL# of a journal volume 512 corresponding to the V-VOL# of the virtual volume 513 as the write destination and the end LBA# of the journal volume 512. Subsequently, the virtual volume controller 415 writes the write data in a location on or following the acquired end LBA# of the acquired journal volume 512 (S1741). Note that an update of the journal volume 512 cannot be performed, and the data is added in a location on or following the end LBA#.

Next, the virtual volume controller 415 updates the content of the journal volume-LBA management table 424 (S1742). Next, the virtual volume controller 415 sets the LBA# of the journal volume 512 in which the write data has been written in S1741 in association with the LBA# 4232 of the virtual volume 513 as the write destination in the virtual volume-LBA management table 423 (S1743). Note that the write data is accordingly updated, concerning the virtual volume 513.

Next, in order to prevent a replica of the updated data from being acquired by the aforementioned replication function, the virtual volume controller 415 sets "0: not replicated" in the replication completion flag 4235 of each virtual block for which the LBA# has been set in S1743 in the virtual volume-LBA management table 423 (S1743), and then updates the end LBA# of the journal volume management table 422 (S1744). In this manner, write data with respect to virtual volume 513 is updated (S1745), and the processing exits.

As described above, in this embodiment, when update writing is performed with respect to a virtual volume 513 according to an I/O request after the attribute of the virtual volume 513 has been changed from the attribute (Read/Add) that permits only reading and write once to the attribute (Read/Write) that enables reading and writing, the data to be written by the update writing is "added" to a journal volume 512 as an entity of the virtual volume 513. In this manner, since the update writing with respect to the journal volume 512 is prohibited in the storage apparatus 10 of this embodiment, the data already written in the journal volume 512 can be protected without fail.

<Data Read Request>

FIG. 18 is a flowchart illustrating processing (hereinafter referred to as "data read processing S1800") performed mainly by the virtual volume controller 415 of the storage apparatus 10 when a data read request with respect to the virtual volume 513 is transmitted from the host apparatus 2 to the storage apparatus 10. Hereinafter, the data read processing S1800 will be described with reference to FIG. 18. Note that the data read request is accompanied by the V-VOL# of the virtual volume 513 as a read destination and the LBA# of the read destination.

Upon receipt of the data read request for the virtual volume 513 (S1811: YES), the virtual volume controller 415 refers to the virtual volume management table 421 and judges whether or not the attribute currently set in the virtual volume 513 as the read destination is "Protect" (S1812). If the attribute currently set is not "Protect" (S1812: NO), the processing proceeds to S1821. If the attribute currently set is "Protect" (S1812: YES), an error is sent back to the host apparatus 2 (S1813), and the processing is terminated.

In S1821, the virtual volume controller 415 refers to the virtual volume management table 421, and judges whether or not the LBA# of the read destination designated by the data read request is greater than the LBA# set in the end LBA# 4216 of the virtual volume 513 as the read destination. When the LBA# of the read destination is greater than the LBA# set in the end LBA# 4216 (S1821: YES), read data set with a predetermined value such as a null value or 0 is generated (S1815) and sent back to the host apparatus 2 (S1824), and the processing is terminated. Note that this is because the data read request has designated an area where data is not yet written.

In S1822, the virtual volume controller 415 refers to the virtual volume-LBA management table 423, and acquires the J-VOL# and the LBA# of the journal volume 512 corresponding to the V-VOL# and the LBA# of the virtual volume 513 as the read destination.

Next, the virtual volume controller 415 reads data of the journal volume 512 stored in the acquired J-VOL# and the LBA# (S1823), and transmits the read data to the host apparatus 2 (S1824).

As described above, the storage apparatus 10 of this embodiment provides a virtual volume 513 as the volume accessible from the host apparatus 2, and enables setting of the attribute (Read/Add) that permits only reading and write once with respect to each virtual volume 513. Therefore, regarding a virtual volume 513 for which the attribute is set, data already written in the virtual volume 513 can only be read, and writing is allowed only as write once. Therefore, with the storage apparatus 10 of this embodiment, both effective use of the storage area provided by the storage device 17 and protection of data can be achieved. Since the journal volume 512 as the entity of the virtual volume 513 is hidden from the host apparatus 2, tampering or the like of the journal volume 512 cannot be performed from the host apparatus 2, and the security is accordingly enhanced.

=Replication Function=

Next, a function (hereinafter referred to as "replication function") of the storage apparatus 10 of acquiring a replica (backup) of the data stored in the virtual volume 513 will be described. The user can perform setting relating to the replication function by operating the management apparatus 3. FIG. 19 shows a screen (hereinafter referred to as "replication function setting screen 1900") displayed in the management apparatus 3 at the time of setting relating to the replication function.

As shown in FIG. 19, the replication function setting screen 1900 is provided with a replication source designation field 1911 for designating a virtual volume 513 as a replication source, a replication destination apparatus designation field 1912 for designating the storage apparatus 10 or 50 as the replication destination, a replication destination journal volume designation field 1913 for designating a journal volume 512 as the replication destination, a display field 1914 that visually displays the relations among the virtual volumes 513 and the journal volumes 512 each serving as the replication source or the replication destination, a confirm replication source button 1915 operated in confirming the replication source, a confirm replication destination apparatus button 1916 operated in confirming the storage apparatus 10 or 50 as the replication destination, a confirm journal volume button 1917 operated in confirming the journal volume 512 as the replication destination, a start replication button 1918 for issuing an instruction of the start of replication, and a stop replication button 1919 for issuing an instruction of the stop of the replication.

FIGS. 20 to 22 are flowcharts, regarding the replication function, illustrating processing (hereinafter referred to as "replication processing S2000") performed in the storage system 1. Hereinafter, the replication processing S2000 will be described with reference to FIGS. 20 to 22.

When the user performs an operation for displaying the replication function setting screen 1900 in the management apparatus 3 (S2011: YES), the replication function setting part 413 acquires necessary information from the virtual volume management table 421 of the storage apparatus 10 and displays the replication function setting screen 1900 (S2012).

When the user designates a virtual volume 513 as the replication source from the replication source designation field 1911 of the replication function setting screen 1900 and operates the confirm replication source button 1915 (S2013: YES), the replication function setting part 413 checks whether or not a record having as the replication source the designated virtual volume 513 exists in the virtual volume replication management table 425 of the storage apparatus 10 (S2014). If the record exists (S2014: continue), the processing proceeds to S2211 of FIG. 22. If the record does not exist (S2014: new), the processing proceeds to S2015.

In S2015, the replication function setting part 413 judges whether or not the user has designated the storage apparatus 10 or 50 as the replication destination and operated the confirm replication destination apparatus button 1916. When the confirm replication destination apparatus button 1916 has been operated (S2015: YES), the replication function setting part 413 acquires a list of the journal volumes 512 registered in the journal volume management table 422 of the designated storage apparatus 10 and displays the acquired list of the journal volumes 512 in the replication destination journal volume designation field 1913 of the replication function setting screen 1900 (S2016). The user designates a journal volume 512 as the replication destination in the replication destination journal volume designation field 1913 of the replication function setting screen 1900, and operates the confirm journal volume button 1917.

When the confirm journal volume button 1917 is operated (S2017: YES), the replication function setting part 413 judges whether or not the capacity of the journal volume 512 as the replication destination is greater than or equal to the journal volume 512 as the replication source (S2018). If the capacity of the journal volume 512 as the replication destination is less than the capacity of the journal volume 512 as the replication source (S2018: NO), the replication function setting part 413 displays, in the management apparatus 3, a message prompting the user to select the replication destination again (S2019), and then the processing returns to S2017. If the capacity of the journal volume 512 as the replication destination is greater than or equal to the capacity of the journal volume 512 as the replication source (S2018: YES), the processing proceeds to S2020.

In S2020, the replication function setting part 413 judges whether or not the user has operated the start replication button 1918 of the replication function setting screen 1900 (S2020). When the user has operated the start replication button 1918 (S2020: YES), the replication function setting part 413 instructs the virtual volume replication controller 416 of the storage apparatus 10 to start the replication processing and concurrently gives the content set in the replication function setting screen 1900 (S2021). Subsequently, the processing proceeds to S2111 of FIG. 21.

In S2111 of FIG. 21, the virtual volume replication controller 416 of the storage apparatus 10 judges whether the storage apparatus designated as the replication destination is the local storage apparatus 10 or the remote storage apparatus 50. If the storage apparatus is the remote storage apparatus 50 (S2111: remote), the processing proceeds to S2112. If the storage apparatus is the local storage apparatus 10 (S2111: local), the processing proceeds to S2121.

In S2112, the virtual volume replication controller 416 transmits information (attribute, formatting type, capacity, and expiration period) on the virtual volume 513 as the replication source to the remote storage apparatus 50 as the replication destination.

Thereafter, the virtual volume replication controller 416 adds a record of the virtual volume 513 as the replication destination to the virtual volume management table 421 of the remote storage apparatus 50 as the replication destination (S2113). Also, a record of the virtual volume 513 as the replication destination is added to the virtual volume-LBA management table 423 as the replication destination (S2114).

Subsequently, the virtual volume replication controller 416 replicates the LBA of the virtual volume 513 as the replication source in the virtual volume 513 as the replication destination (S2115). The virtual volume replication controller 416 transfers data of the journal volume 512 configuring the virtual volume 513 as the replication source to the storage apparatus 50 as the replication destination, and performs sequential replication (transfer) of the start LBA to the end LBA to the journal volume 512 configuring the virtual volume 513 as the replication destination (S2116). Note that virtual volume replication controller 416 sets "1: replicated" as the content of the replication completion flag 4235 corresponding to the virtual block (journal block) in which the replication is completed. When the processing of S2116 is completed, the virtual volume replication controller 416 adds a record corresponding to the replication at this time to the virtual volume replication management table 425 (S2117).

Meanwhile, in S2121, the virtual volume replication controller 416 adds a record of the virtual volume 513 as the replication destination to the virtual volume management table 421 on the basis of the information (attribute, formatting type, capacity, and expiration period) on the virtual volume 513 as the replication source (S2121). Also, the virtual volume replication controller 416 adds a record of the virtual volume 513 as the replication destination to the virtual volume-LBA management table 423 (S2122).

Subsequently, the virtual volume replication controller 416 replicates the LBA of the virtual volume 513 as the replication source in the virtual volume 513 as the replication destination (S2123). Next, the virtual volume replication controller 416 performs sequential replication (transfer) of the start LBA to the end LBA of data of the journal volume 512 configuring the virtual volume 513 as the replication source to the journal volume 512 configuring the virtual volume 513 as the replication destination (S2124). Note that the virtual volume replication controller 416 sets "1: replicated" as the content of the replication completion flag 4235 corresponding to the virtual block (journal block) for which the replication at this time is completed. Thereafter, the processing proceeds to S2117.

FIG. 22 is a flowchart continuing from the processing branching from 52014 of FIG. 20 and illustrating the processing performed when the virtual volume 513 already exists in the virtual volume replication management table 425, i.e., when the replication of the virtual volume 513 has been acquired in the past.

In S2211, the replication function setting part 413 acquires the storage apparatus 10 or 50 as the replication destination and the J-VOL# of the replication destination which correspond to the virtual volume 513 as the replication source from the virtual volume replication management table 425 of the storage apparatus 10.

In S2212, the replication function setting part 413 judges whether or not the user has operated the start replication button 1918 in the replication function setting screen 1900 (S2212). When the user has operated the start replication button 1918 (S2212: YES), the replication function setting part 413 instructs the virtual volume replication controller 416 of the storage apparatus 10 to start the replication processing and concurrently gives the content set in the replication function setting screen 1900 (S2213).

Next, the virtual volume replication controller 416 of the storage apparatus 10 judges whether the storage apparatus designated as the replication destination is the local storage apparatus 10 or the remote storage apparatus 50 (S2214). If the storage apparatus is the remote storage apparatus 50 (S2214: remote), the processing proceeds to S2215. If the storage apparatus is the local storage apparatus 10 (S2214: local), the processing proceeds to S2221.

Next, the virtual volume replication controller 416 of the storage apparatus 10 refers to the virtual volume-LBA management table 423 and extracts an LBA of the virtual volume 513 as the replication source for which the replication completion flag is set to "0" (S2215).

The virtual volume replication controller 416 of the storage apparatus 10 subsequently replicates the extracted LBA of the virtual volume 513 as the replication source in the virtual volume 513 as the replication destination (S2216). Thereafter, the virtual volume replication controller 416 transfers data in the extracted LBA of the journal volume 512 configuring the virtual volume 513 as the replication source to the storage apparatus 50 as the replication destination, and replicates (transfers) the data in the extracted LBA in the journal volume 512 configuring the virtual volume 513 as the replication destination (S2217). Note that, at this time, the virtual volume replication controller 416 sets "1: replicated" for the content of the replication completion flag 4235 corresponding to the virtual block (journal block) for which the replication has been completed.

Meanwhile, in S2221, the virtual volume replication controller 416 of the storage apparatus 10 refers to the virtual volume-LBA management table 423 and extracts an LBA# of the virtual volume 513 as the replication source for which the replication completion flag is set to "0."

The virtual volume replication controller 416 of the storage apparatus 10 subsequently replicates the extracted LBA of the virtual volume 513 as the replication source in the virtual volume 513 as the replication destination (S2222). Thereafter, the virtual volume replication controller 416 replicates data in the extracted LBA of the journal volume 512 configuring the virtual volume 513 as the replication source, in the journal volume 512 configuring the virtual volume 513 as the replication destination (S2223). Note that, at this time, the virtual volume replication controller 416 sets "1: replicated" for the content of the replication completion flag 4235 corresponding to the virtual block (journal block) for which the replication has been completed.

As described above, with the storage apparatus 10 of this embodiment, same type of volumes being the virtual volumes 513 are used as the replication source and the replication destination so that a replica (backup) of the virtual volume 513 can be acquired. Therefore, the mechanism of the replication management for the virtual volume 513 can easily be implemented.

When replication is to be performed again for the virtual volume 513 for which the replication has been performed in the past, only replication of a block for which the replica has not been acquired is performed. This prevents data to be repeatedly transferred and enables the replication to be performed efficiently and promptly.

The present embodiment has been described hereinabove. The embodiment is presented only to facilitate understanding of the present invention, and thus not to provide limited interpretation of the present invention. The present invention may be modified or improved without departing from the gist thereof, and the present invention also includes equivalents thereof.

The invention claimed is:

1. A storage apparatus comprising:
    a communication interface that receives an I/O request sent from a host apparatus;
    a storage device controller that performs writing and reading of data with respect to a storage device;
    a cache memory that stores data to be written in the storage device or data read from the storage device;
    a journal volume controller that provides a journal volume operated as a volume for which update writing is prohibited and write once is permitted, on the basis of a storage area provided by the storage device; and
    a virtual volume controller that provides a virtual volume as a volume accessible from the host apparatus, the journal volume being an entity of the virtual volume, and the virtual volume being a volume for which an attribute (Read/Add) permitting only reading and write once is settable.

2. The storage apparatus according to claim 1, further comprising:
    a control processor that performs data transfer between the communication interface, the storage device controller, and the cache memory, wherein
    the virtual volume controller provides the virtual volume as a volume for which an attribute (Read/Write) that enables reading and writing is further settable in addition to the attribute (Read/Add), and
    adds data to be written by the update writing to the journal volume as the entity of the virtual volume when update writing is performed on a virtual volume according to the I/O request after the attribute set for one of the virtual volumes has been changed from the attribute (Read/Add) that permits only reading and write once to the attribute (Read/Write) that enables reading and writing.

3. The storage apparatus according to claim 1, wherein the virtual volume controller configures one journal volume as an entity of a plurality of the virtual volumes.

4. The storage apparatus according to claim 1, wherein the virtual volume controller provides the virtual volume as a volume for which at least one of an attribute (Read Only) that enables only reading, an attribute (Protect) that prohibits an access to the virtual volume, and an attribute (Read/Write) that enables reading and writing is further settable in addition to the attribute (Read/Add).

5. The storage apparatus according to claim 1, further comprising a virtual volume replication controller that replicates one of the virtual volumes as another one of the virtual volumes.

6. The storage apparatus according to claim 5, wherein
    the storage apparatus
    stores presence or absence of a replica for each block of the virtual volume, and
    the virtual volume replication controller
    performs replication of only the block on which a replica is not acquired when replication is performed again for the virtual volume on which replication has been performed in the past.

7. The storage apparatus according to claim 1, wherein
    the storage device is configured by using a hard disk drive, and
    the storage area provided by the storage device is a storage area of a logical device configured by using a RAID group.

8. A management apparatus that is communicatively coupled to the storage apparatus according to claim 5 and provides a function for a user to manage the virtual volume, wherein the management apparatus
    outputs information showing that the replica has not been acquired, when one of the virtual volumes is to be deleted and the replica of the virtual volume has not been acquired.

9. A management apparatus that is communicatively coupled to the storage apparatus according to claim 1 and provides a function for a user to manage the virtual volume, the management apparatus comprising:
a virtual volume management part that provides a function for a user to change the attribute set for the virtual volume, wherein
the virtual volume management part manages an expiration period of a setting of the virtual volume for which the attribute (Read/Add) is set, prohibits a change from the attribute (Read/Add) to another attribute before end of the expiration period, and enables a setting of the attribute (Read/Add) after the expiration period.

10. A management apparatus that is communicatively coupled to the storage apparatus according to claim 1 and provides a function for a user to manage the virtual volume, the management apparatus comprising:
a virtual volume management part that provides a function for a user to change the attribute set for the virtual volume, wherein
the virtual volume management part does not permit a change to an attribute that may cause change in data already written in the virtual volume when the user attempts to change the attribute, of the virtual volume for which the attribute (Read/Add) is set, to another attribute.

11. A management apparatus that is communicatively coupled to the storage apparatus according to claim 1 and provides a function for a user to manage the virtual volume, the management apparatus comprising:
a virtual volume management part that provides a function for a user to change the attribute set for the virtual volume, wherein the virtual volume management part does not permit a change of the attribute when changing the attribute of the virtual volume, the virtual volume is reserved by processing of the I/O request.

12. A method of controlling a storage apparatus including:
a communication interface that receives an I/O request sent from a host apparatus;
a storage device controller that performs writing and reading of data with respect to a storage device; and
a cache memory that stores data to be written in the storage device or data read from the storage device, the method comprising the steps of:
providing, at the storage apparatus, a journal volume operated as a volume for which update writing is prohibited and write once is permitted, on the basis of a storage area provided by the storage device; and
providing, at the storage apparatus, a virtual volume as a volume accessible from the host apparatus, the journal volume being an entity of the virtual volume, and the virtual volume being a volume for which an attribute (Read/Add) permitting only reading and write once is settable.

13. The method of controlling the storage apparatus according to claim 12, the method comprising the steps of:
providing, at the storage apparatus, the virtual volume as a volume for which an attribute (Read/Write) that enables reading and writing is further settable in addition to the attribute, and
adding, at the storage apparatus, data to be written by the update writing to the journal volume as the entity of the virtual volume when update writing is performed on a virtual volume according to the I/O request after the attribute set for one of the virtual volumes has been changed from the attribute (Read/Add) that permits only reading and write once to the attribute (Read/Write) that enables reading and writing.

14. The method of controlling the storage apparatus according to claim 12, the method further comprising the step of:
configuring, at the storage apparatus, one journal volume as an entity of a plurality of the virtual volumes.

* * * * *